United States Patent
Stoner et al.

(10) Patent No.: US 10,213,861 B2
(45) Date of Patent: Feb. 26, 2019

(54) AUTOMATED SYSTEM FOR MACHINE SET-UP OF WELDING POWER SOURCES AND WELDING SYSTEMS

(71) Applicant: Illinois Tool Works Inc., Glenview, IL (US)

(72) Inventors: Collin Stoner, San Jose, CA (US); John Luck, Appleton, WI (US); Anthony J. Kowaleski, Manawa, WI (US); Bruce A. Casner, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1295 days.

(21) Appl. No.: 14/192,305

(22) Filed: Feb. 27, 2014

(65) Prior Publication Data

US 2014/0251969 A1    Sep. 11, 2014

Related U.S. Application Data

(60) Provisional application No. 61/776,126, filed on Mar. 11, 2013.

(51) Int. Cl.
| | |
|---|---|
| B23K 9/10 | (2006.01) |
| B23K 9/095 | (2006.01) |
| B23K 9/09 | (2006.01) |
| B23K 9/32 | (2006.01) |

(52) U.S. Cl.
CPC ............. *B23K 9/09* (2013.01); *B23K 9/1043* (2013.01); *B23K 9/32* (2013.01)

(58) Field of Classification Search
CPC ........... B23K 9/09; B23K 9/32; B23K 9/1043
USPC ............................................ 219/130.21, 132
See application file for complete search history.

(56) References Cited

U.S. PATENT DOCUMENTS

| | | | | |
|---|---|---|---|---|
| 4,001,540 A | * | 1/1977 | Drake ................. | B23K 11/252 219/110 |
| 4,024,371 A | * | 5/1977 | Drake ................. | B23K 11/252 219/110 |
| 4,359,622 A | * | 11/1982 | Dostoomian ........ | B23K 11/252 219/109 |
| 4,541,055 A | * | 9/1985 | Wolfe ................... | B23K 26/08 219/121.82 |
| 4,545,018 A | * | 10/1985 | Clements ............... | B23K 26/26 219/121.61 |

(Continued)

FOREIGN PATENT DOCUMENTS

| | | |
|---|---|---|
| CN | 1817543 A | 8/2006 |
| CN | 101678496 A | 3/2010 |

(Continued)

OTHER PUBLICATIONS

Canadian Intellectual Property Office, Official Action, U.S. Pat. No. 2,891,438, dated Mar. 17, 2017.

(Continued)

*Primary Examiner* — Eric Stapleton
(74) *Attorney, Agent, or Firm* — McAndrews, Held & Malloy, Ltd.

(57) ABSTRACT

A system for re-configuring a welding system provides the ability to download applications to a welding power source or system, and to store the configuration data and applications to one or more of a series of welders, thereby simplifying configuration and re-configuration of power sources.

14 Claims, 15 Drawing Sheets

(56) References Cited

U.S. PATENT DOCUMENTS

| | | | | | |
|---|---|---|---|---|---|
| 4,560,856 A * | 12/1985 | Miller | ............... | B23K 26/043 | 219/121.63 |
| 4,561,059 A * | 12/1985 | Davis | ............... | B23K 9/073 | 219/130.21 |
| 4,721,947 A * | 1/1988 | Brown | ............... | B23K 9/0956 | 228/103 |
| 4,821,202 A * | 4/1989 | Davis | ............... | B23K 9/067 | 219/124.02 |
| 4,877,940 A * | 10/1989 | Bangs | ............... | B23Q 35/127 | 219/124.34 |
| 5,070,226 A * | 12/1991 | Raycher | ............... | B23K 9/202 | 219/98 |
| 5,149,940 A * | 9/1992 | Davis | ............... | B23K 9/067 | 219/130.21 |
| 5,510,596 A * | 4/1996 | Xu | ............... | B23K 9/0953 | 219/124.34 |
| 5,708,253 A * | 1/1998 | Bloch | ............... | B23K 9/0953 | 219/130.01 |
| 6,002,104 A * | 12/1999 | Hsu | ............... | B23K 9/0953 | 219/130.5 |
| 6,441,342 B1 * | 8/2002 | Hsu | ............... | B23K 9/091 | 219/130.01 |
| 6,486,439 B1 * | 11/2002 | Spear | ............... | B23K 9/1062 | 219/136 |
| 6,531,684 B2 * | 3/2003 | Rice | ............... | B23K 9/073 | 219/130.21 |
| 6,552,303 B1 * | 4/2003 | Blankenship | ............... | B23K 9/0953 | 219/130.5 |
| 6,583,386 B1 * | 6/2003 | Ivkovich | ............... | B23K 9/0953 | 219/125.1 |
| 6,624,388 B1 * | 9/2003 | Blankenship | ............... | B23K 9/1062 | 219/130.5 |
| 6,636,776 B1 * | 10/2003 | Barton | ............... | B23K 9/1062 | 219/109 |
| 6,700,097 B1 * | 3/2004 | Hsu | ............... | B23K 9/09 | 219/130.5 |
| 6,788,980 B1 * | 9/2004 | Johnson | ............... | G05B 19/042 | 700/1 |
| 6,795,778 B2 * | 9/2004 | Dodge | ............... | B23K 9/0953 | 219/110 |
| 6,815,640 B1 * | 11/2004 | Spear | ............... | B23K 9/095 | 219/130.5 |
| 7,009,144 B2 * | 3/2006 | Schmidt | ............... | B23K 9/095 | 219/130.01 |
| 7,049,547 B1 * | 5/2006 | Brunner | ............... | B23K 9/1062 | 219/130.5 |
| 7,173,429 B2 * | 2/2007 | Kutkut | ............... | G01R 31/3648 | 324/431 |
| 7,307,241 B2 * | 12/2007 | Hayes | ............... | B23K 9/0953 | 219/130.5 |
| 7,523,069 B1 * | 4/2009 | Friedl | ............... | B23K 9/32 | 219/78.01 |
| 8,188,405 B2 * | 5/2012 | Martin | ............... | B23K 9/1006 | 219/130.5 |
| 8,785,817 B2 * | 7/2014 | Luck | ............... | B23K 9/1087 | 219/130.1 |
| 9,095,921 B2 * | 8/2015 | Peters | ............... | B23K 9/0953 | |
| 9,352,411 B2 * | 5/2016 | Batzler | ............... | B23K 9/32 | |
| 9,442,481 B2 * | 9/2016 | Davidson | ............... | B23K 9/0956 | |
| 9,511,443 B2 * | 12/2016 | Pfeifer | ............... | B23K 9/095 | |
| 2003/0052109 A1 * | 3/2003 | Hayes | ............... | B23K 9/0953 | 219/130.5 |
| 2003/0071025 A1 * | 4/2003 | Hsu | ............... | B23K 9/09 | 219/130.5 |
| 2004/0149694 A1 * | 8/2004 | Hett | ............... | B23K 9/205 | 219/98 |
| 2004/0215422 A1 * | 10/2004 | Dodge | ............... | B23K 9/0953 | 702/183 |
| 2005/0035105 A1 * | 2/2005 | Spear | ............... | B23K 9/095 | 219/130.5 |
| 2005/0127918 A1 * | 6/2005 | Kutkut | ............... | G01R 31/3648 | 324/430 |
| 2005/0258154 A1 * | 11/2005 | Blankenship | ............... | B23K 9/0953 | 219/130.01 |
| 2006/0207980 A1 * | 9/2006 | Jacovetty | ............... | B23K 9/1062 | 219/130.5 |
| 2006/0231538 A1 * | 10/2006 | Rice | ............... | B23K 9/32 | 219/136 |
| 2007/0051711 A1 * | 3/2007 | Kachline | ............... | B23K 9/1056 | 219/130.01 |
| 2007/0080149 A1 * | 4/2007 | Albrecht | ............... | B23K 9/10 | 219/130.01 |
| 2007/0262065 A1 * | 11/2007 | Peters | ............... | B23K 9/092 | 219/130.5 |
| 2008/0116186 A1 * | 5/2008 | Luck | ............... | B23K 9/1062 | 219/132 |
| 2009/0184098 A1 * | 7/2009 | Daniel | ............... | B23K 9/0953 | 219/130.1 |
| 2009/0222804 A1 * | 9/2009 | Kaufman | ............... | B23K 9/0953 | 717/168 |
| 2011/0114611 A1 * | 5/2011 | Cole | ............... | B23K 9/1006 | 219/130.1 |
| 2011/0198328 A1 * | 8/2011 | Casner | ............... | B23K 9/095 | 219/125.1 |
| 2011/0198329 A1 * | 8/2011 | Davidson | ............... | B23K 9/095 | 219/130.5 |
| 2012/0325792 A1 * | 12/2012 | Stein | ............... | B23K 9/32 | 219/148 |
| 2013/0068745 A1 * | 3/2013 | Agosti | ............... | B23K 9/1675 | 219/137.9 |
| 2013/0119036 A1 * | 5/2013 | Daniel | ............... | B23K 9/095 | 219/130.21 |
| 2013/0119037 A1 * | 5/2013 | Daniel | ............... | B23K 9/095 | 219/130.21 |
| 2013/0264319 A1 * | 10/2013 | Temby | ............... | B23K 9/095 | 219/130.1 |
| 2014/0001169 A1 * | 1/2014 | Enyedy | ............... | B23K 9/1006 | 219/137.71 |
| 2014/0332515 A1 * | 11/2014 | Luck | ............... | B23K 9/1062 | 219/132 |

FOREIGN PATENT DOCUMENTS

| | | |
|---|---|---|
| CN | 101687268 A | 3/2010 |
| EP | 1702707 A | 9/2006 |
| EP | 2145715 A1 | 1/2010 |
| WO | 02058878 A | 8/2002 |
| WO | 2011058432 A1 | 5/2011 |
| WO | 2011100214 A1 | 8/2011 |

OTHER PUBLICATIONS

Office Action for Canadian Application No. 2,891,438 dated Feb. 16, 2018, 4 pages.

International Search Report, International application No. PCT/US2014/020091, dated Nov. 5, 2014.

Canadian Intellectual Property Office, Official Action, U.S. Pat. No. 2,891,438, dated May 9, 2016.

* cited by examiner ures, communicatively coupling the user interface to a welding power supply comprising a controller and a memory for storing welding procedures. The user is prompted to identify a weld parameter which can be, for example a weld joint, a weld material, and a consumable for use in a weld to be performed. At least one weld procedure from the database that corresponds to the selected weld parameter is displayed to the user, and the user is prompted to select the weld procedure.

AUTOMATED SYSTEM FOR MACHINE SET-UP OF WELDING POWER SOURCES AND WELDING SYSTEMS

CROSS REFERENCE TO RELATED APPLICATION

This application claims the benefit of U.S. Provisional Application No. 61/776,126 filed Mar. 11, 2013, which is hereby incorporated by reference in its entirety.

FIELD OF THE INVENTION

The present invention is directed to welding equipment, and more specifically to a method and apparatus for automated modification of a welding system for use in various welding applications and systems.

BACKGROUND OF THE INVENTION

To increase efficiency and profit, manufacturing facilities seek to limit unplanned downtime, assure that consistent quality parameters are maintained, and minimize set-up times and costs. Each of these goals require equipment that is flexible, and that can be updated or replaced quickly.

When a production line goes down because of equipment failure, for example, it is important to replace the equipment quickly to meet production goals. Similarly, when a decision is made to change a welding process used on a manufacturing line it is desirable to be able to re-use the existing equipment, and to re-purpose the equipment for changing requirements. When operators, shifts, or procedures change, it is also important to assure that the same level of quality can be provided, irrespective of the training level of the operator, and without the need for time-consuming set-up procedures on existing equipment.

In manufacturing environments, therefore, it is desirable for welding equipment to be flexible for use in different welding processes, with different welding operators, and for welding different parts. It is also important for management personnel to have the ability to monitor and control the welding processes and parameters to ensure consistent and proper joining of materials, to ensure that completed welds fall within predetermined quality parameters, and to ensure that material waste and operational downtime is avoided. The present invention addresses these and other issues.

SUMMARY OF THE INVENTION

In one aspect, the present disclosure provides a welding power source comprising a power supply for generating welding power, a memory storing weld system configuration data and welding process application code for controlling the power supply, and a communications device configured for communications with an external computerized device. The user interface is in communication with the communications device and the external computerized device, and selectively displays at least one welding process application for selection to download to the memory and selective access to information about the welding process application. A controller is operatively coupled to the power supply, the communications device and the memory, the controller programmed to selectively retrieve the welding process application code for controlling the power supply from at least one of the memory or an external memory associated with the external computerized device when a user selects the welding application function from the user interface for use in controlling the power supply.

In another aspect, the present disclosure provides a method for setting up a welding power source to perform a weld. The method comprises providing a user interface in communication with a database of stored welding procedures, communicatively coupling the user interface to a welding power supply comprising a controller and a memory for storing welding procedures. The user is prompted to identify a weld parameter which can be, for example a weld joint, a weld material, and a consumable for use in a weld to be performed. At least one weld procedure from the database that corresponds to the selected weld parameter is displayed to the user, and the user is prompted to select the weld procedure.

In another aspect, the present disclosure provides a method for configuring a welding power source for use in a welding system to include at least one peripheral device in communication with the welding power source. The method comprises the steps of providing a user interface in communication with a database of stored set-up procedures, communicatively coupling the user interface to a welding power supply comprising a controller and a memory for storing welding power supply configuration data, welding applications, and welding procedures. The user is prompted to retrieve at least one set-up procedure through the user interface, to identify a peripheral device for connection to the welding power supply, and to provide communications data for connecting the peripheral device to the welding power supply. The communications data is stored in a memory in the welding power supply wherein the communications data is retrievable by a user to control the peripheral device.

These and other aspects will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
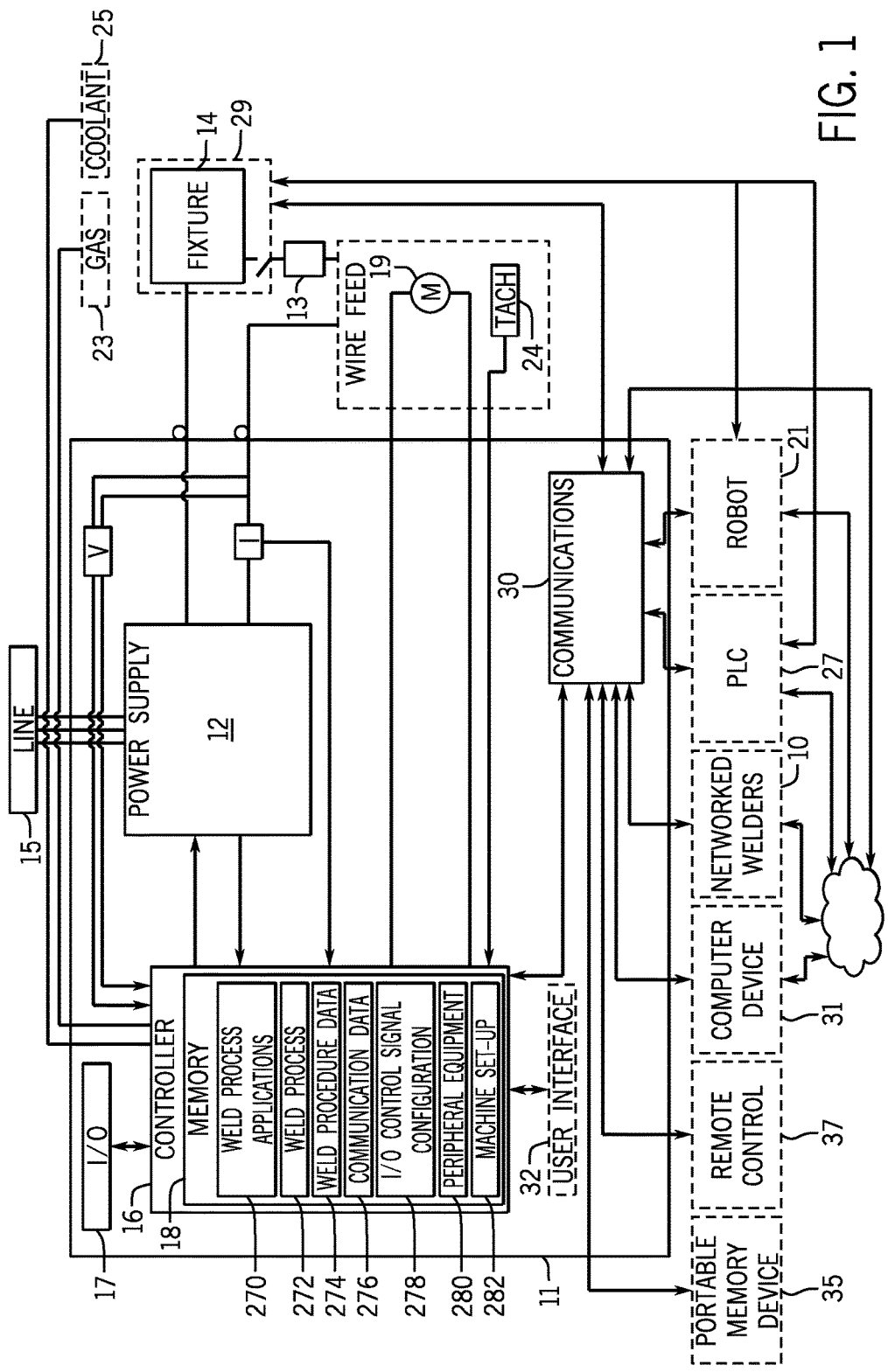
FIG. 1 is a block diagram of a welding system capable of use in the present invention.

Referring now to the Figures and more particularly to FIG. 1, an exemplary block diagram of a welding system 10 for manual, semi-automatic, and automatic welding that can be used in accordance with the present invention is shown. The welding system 10 includes a welding power supply 12, a controller 16, and a communications system 30 for communicating with external components. The controller 16 of welding system 10 can further be optionally connected to external welding components including a wire feed system 20, a gas valve 23 and a coolant system 25. As shown here, the power supply 12, controller 16, and communications system 30 are shown in housing 11. These components are also referred to as a welding power source herein.

Referring still to FIG. 1, as discussed above, in some applications welding system 10 can include a wire feed system 20 which typically includes a motor 19 that drives wire through drive rolls and a liner to a torch or gun 13. The gas valve 23 can be either an on/off valve, a metered valve controlled by controller 16, or can include a separate or integral flow meter. Similarly, when a coolant system is provided, the system can include an on/off or metered valve, and flow metering devices. The power supply 12 can be a constant current power supply, a constant voltage power supply or a constant voltage/constant current power supply, and can also include pulsing capabilities, as discussed more fully below. The power supply can comprise a switching or inverter power supply that rectifies the line power 15 and then switches the DC power into a step down transformer to produce the desired welding voltage or current, and/or a transformer that converts the high voltage and low current electricity from the utility mains into a high current and low voltage, or include other types of power supplies.

Referring still to FIG. 1, the controller 16 can include one or more microcontroller, microprocessor, digital signal processor, or other programmable controller, along with one or more internal or external memory component 18, capable of storing weld configuration data and control code for controlling the power supply 12, as described more fully below.

Communications between the controller 16, operators, and external components can be provided through one or more of a user interface 32, the communications system 30, and input/output communications connector 17. A user interface 32 can include a user display and input devices, such as keys, switches, joysticks, analog or digital potentiometers, or other devices to provide information to and receive information from an operator or user of the welding system 10, or be a graphical touch screen or other graphical display. The user interface can, for example, be mounted in a housing 11 with the power supply 12 and controller 16, or be provided in a separate housing from the power supply 12. Although shown connected to the controller 16 in FIG. 1, the user interface 32 can also be connected as a remote control 37 through communications system 30. One or more user interface 32 can be provided in welding system 10. As discussed above, the components of the system in housing 11 can also be collectively referred to as a welding power source.

The communications system 30 can include, for example, an embedded web server, serial communication devices such as DeviceNet, Profibus, RS-232, wired or wireless network communication devices such as an Ethernet, LAN, WAN, Bluetooth, or other network, RF communications port, memory access devices such as a Secure Digital Card (SD) Card reader, Universal Serial Bus port or other devices or systems. The communications system 30 can be linked to the components of a welding cell, including flexible or hard automation components, such as a welding robot 21, a programmable logic controller (PLC) 27, and fixtures 29. Alternatively, or additionally, the external components can include one or more computer, computerized device or computer network 31, or a series of networked welding systems 10. The communications system may also connect to external memory, including a portable memory device 35 such as an SD card or a USB flash memory device, which allow a user to upload data to and download data from the memory 18. Computerized devices can include, for example, cellular telephones, tablet devices, laptops, and personal digital assistants.

Referring still to FIG. 1, an exemplary input/output connector (I/O connector) 17, which provides connection points for external or peripheral equipment to provide input signals to the welding system 10 and to receive discrete outputs and feed back signals from the welding system 10 is shown. The inputs and outputs can include, among other indicators, welding process state conditions and error conditions. Common welding process state condition signals input and output through the I/O connector 17 can include, for example, triggering signals for triggering a weld or welding sequence, contactor on (weld on), coolant on, high frequency on (HF on), gas valve on (purge), wire feed motor foreword (jog), wire feed motor reverse (retract), weld program selection, and touch sense detect. Common error conditions can include, for example, voltage sense error, arc start error, wire stick errors, motor over current errors, coolant flow errors, or gas flow errors. Analog input and output signals, including amperage command and feedback, voltage command and feedback, wire feed command and feedback, and current feedback can also be provided on the I/O communications connector 17. Welding state data, error data, feedback and command data can also be transmitted to and from the welding system 10 through communications system 30 discussed above. The I/O communications connector 17 can be configured as a printed circuit board, terminal connector board, or other type of hardware connector. Alternatively, the I/O communications connector could provide communications using a known communications protocol such as RS-232, RS-485, Bluetooth, and other protocols.

Referring still to FIG. 1, external devices, such as a handheld gun or torch or other device with a trigger switch, a robot controller associated with robot 21, PLC 27, or a remote system and display such as an externally connected PC, can provide a signal to the controller 16 of the welding system 10 to start a weld. The weld parameter commands can be retrieved from memory 18, or be provided from the robot 21, PLC 27, or other external device through communications system 30, or selected at the user interface 32.

Referring still to FIG. 1, the welding system 10 is connected to an input power supply line 15, typically a three phase supply, which provides power both for the control circuitry and for the welding power supply 12. Voltage and current sensors (not shown) can be provided on the input power supply line to allow the power supply to be monitored, typically by controller 16. The welding power supply 12 can be an inverter power supply, and, as described above, can be a constant current (CC), constant voltage (CV), or a constant voltage/constant current (CV/CC) power supply. The power source can provide AC, DC or selectable AC/DC output, and can include pulsing capabilities. Depending on configuration, the power source can provide the ability to perform TIG (GTAW), stick, MIG (GMAW) welding, pulsed TIG (GTAW-P), pulsed MIG (GMAW P), flux-cored (FCAW) welding, and other types of welding processes.

In one aspect of the invention, the welding system 10 can be configured as a "base" unit having a pre-determined minimal feature set. For example, a typical basic CC power supply would provide the user with capabilities to adjust the amperage output of the power supply, and to view actual voltage and current during a weld through the user interface 32. A typical CV power supply would allow a user to adjust the voltage output, and to view volts and amps. To provide different, and typically more advanced features, a user can change the configuration of the system by unlocking features or uploading additional features to the memory 18 through the communications system 30. A user, therefore, can re-configure the power supply to include additional features as needed, as conditions change, or as the operator of the equipment changes, as described more fully below. To make those upgrades or adjustments, weld application code 270, weld process data 273, weld procedure data 274, communication data 276, control signal configuration data 228, peripheral equipment data 280, and machine setting or set-up data 282 can be stored in memory 18, as described more fully below. Instructions for guiding the user in setting up the system to store functions and settings for use in the selected application can be provided, also as discussed below.

Figure 2:
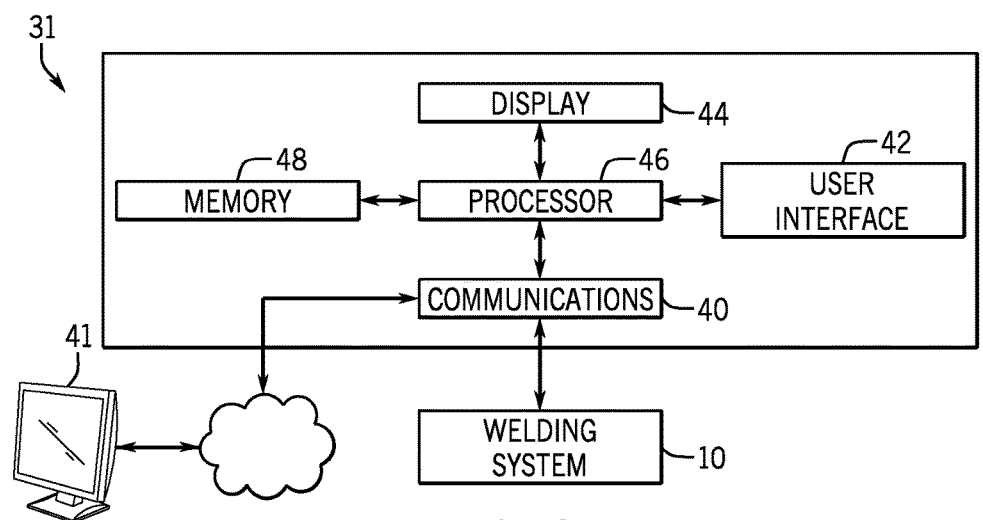
FIG. 2 is a block diagram of a remote computer useful for configuring the welding system of FIG. 1.

Referring now to FIG. 2, in one example, the welding system 10 or a series of networked welders 10 can be in communication with a computer 31 and configured, either individually or as a group, from the computer 31. The user can acquire access to configure systems from the computer 31 by entering a serial number of the machine, or by acquiring a global license for a number of machines. Through the computer 31, the user can access customer information, including updated software, and promotional offers. The computer 31 can also provide access to on-line owners manuals, service manuals, service and distributor information, and accessories. Although the computer 31 is shown here external to housing 11, in some applications, computer 31 or functions discussed with reference to computer 31 can be embedded in housing 11, and can be accessed through user interface 32 or another interface.

As shown here, the computer 31 includes a communications device 40, user interface 42, display 44, a processor 46, and a memory device 48. The communications device 40 can be communicatively coupled to communications device 30 in welding system 10 via a wired or wireless network such as a LAN, WAN, or the internet, and can, for example, provide a user interface. Alternatively, as described above, the communications device 40 can include a drive capable of writing stored data including programs and configuration data to a memory device such as a flash drive or SD card, which can then be received in a corresponding read device in communications device 30 in the welding system 10. The user interface 42 can include one or more known components, including a keyboard, mouse, joystick, touch screen, speaker and corresponding voice recognition software, or various other types of user interfaces which will be apparent to those of ordinary skill in the art. Although device 31 is described as a computer, as used herein the term applies to various types of devices having a similar configuration and can include cellular telephones, personal digital assistants, tablet computing devices, and other devices. Further, as described above, although the computer 31 is shown separately here, in some applications, the processes described below can be performed on controllers or computerized devices embedded in the welding power source or system 10.

To configure and add functions to welding system 10, memory 48 on computer 31 can store data and software for programming welding system 10 or can retrieve this data from a remote computer network device or server 41 connected to computer 31 through a wired or wireless network connection or the internet. By accessing configuration data and adding applications through the remote computer 31, a user can download applications for the welding system 10, set up or configure the welding system 10, establish welding parameter and range limits for the welding system 10, and store the corresponding software applications and configuration information in memory 18. As shown here, stored data can include code for welding applications 270, weld process selections 272, weld procedures data 274, communications configuration data 276, power source and welding system machine set-up and settings 282, I/O control signal configuration 278, peripheral equipment 280, and weld operator identification data corresponding to selected weld procedures, machine settings, or other data. The computer 31 provides the ability to save the configuration information to another welding system 10 by use of a machine cloning operation, as described more fully below.

Alternatively, software for updating or configuring the welding system 10 can also be stored in memory 18 of the welding system 10. The software, for example, can be stored in the memory 18 and then unlocked through a connected computer 31, or a portable memory device 35, as described above. In alternative applications, the software could also be downloaded to computer 31 to memory device 35, and loaded into the memory 18. Various other methods of loading software into the system will also be apparent.

Figure 3:
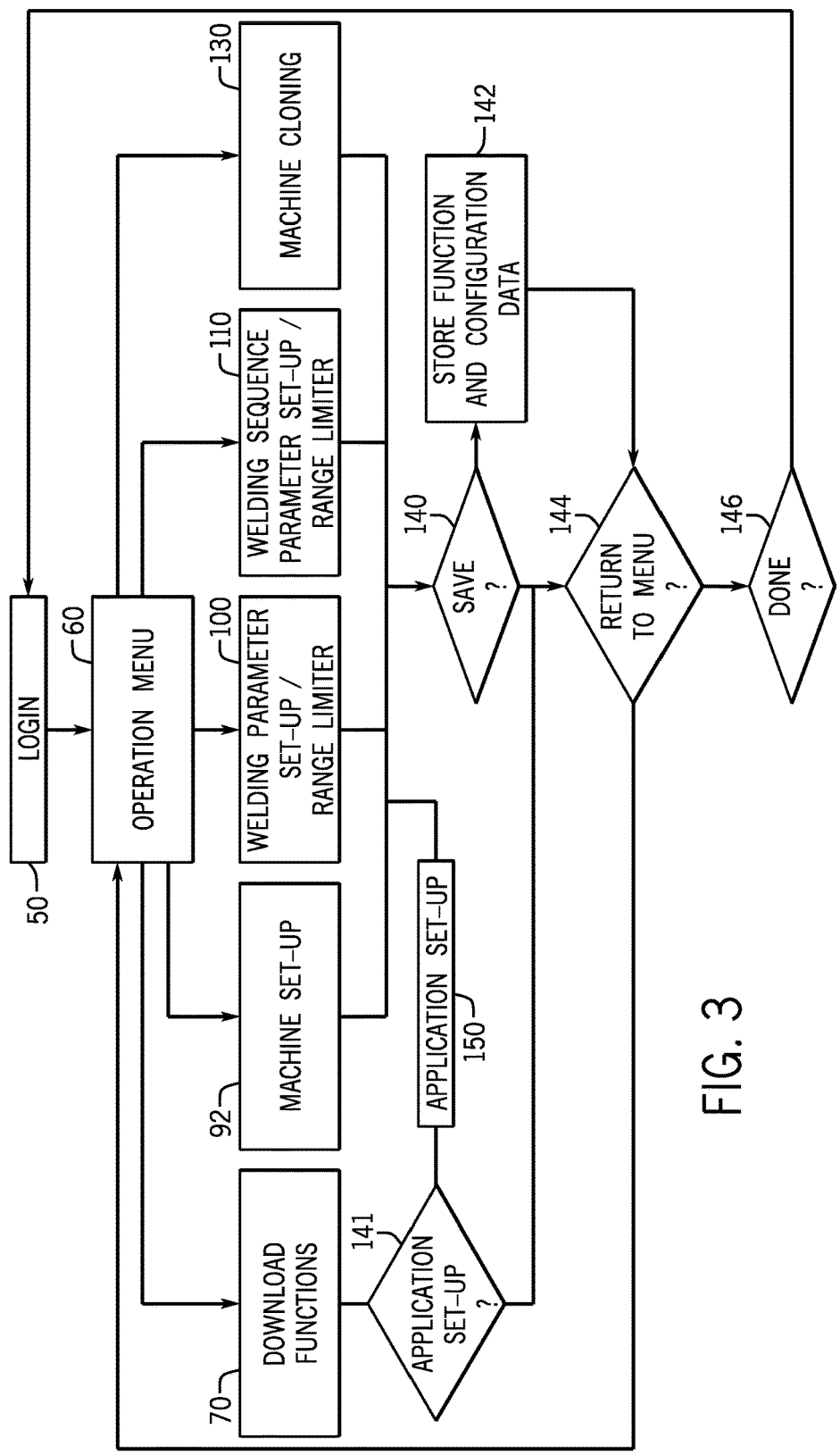
FIG. 3 is a flow chart illustrating an exemplary process for configuring the welding system of FIG. 1

Referring now to FIG. 3, an exemplary flow chart of a process for configuring welding system 10 is shown. As described more fully below, when a user accesses computer 31, the user can initially be prompted to enter identifying data through a login process or screen 50. When the user gains access to the system, the user can be prompted to select an operation from an operations menu 60. The selected operations can include a download applications function 70, a machine set-up function 90, a welding parameter set-up and range limiter function 100, a welding sequence parameter and range limit set-up 110, and a machine cloning function 130. After the user selects among these functions and follows the steps to configure the machine, as described below, the user is given the option to save the configuration (step 140), resulting in storage of the configuration data to one or more of memory 48 in computer 30, memory 18 in welding system 10, or a portable memory device, such as a flash drive or SD card that can be written to from communications device 40 in computer 31. After the configuration is saved, or if the user chooses not to save, the user is given the option to return to the menu 60 (step 144) or to exit the system (step 146). Each of these steps is described more fully below.

Figure 4:
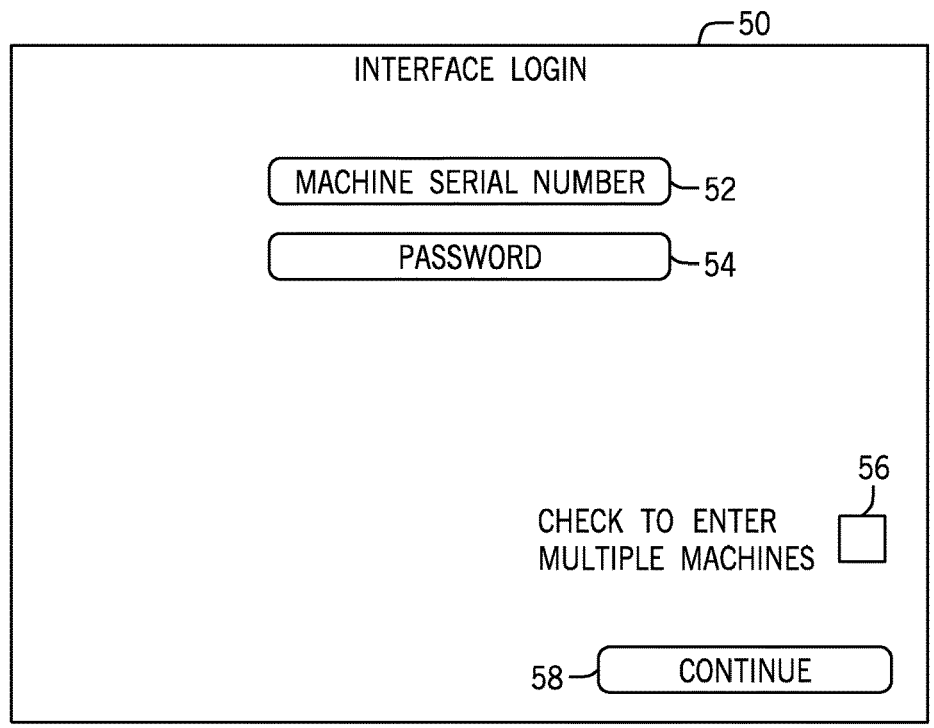
FIG. 4. is a screen shot of a login screen for a user accessing the remote computer of FIG. 2 to configure the welding system of FIG. 1.

Referring now to FIG. 4, to access functions for programming or configuring the welding system 10, the user initially is provided with an interface login screen 50 on display 44 of computer 31. Interface login screen 50 prompts a user to enter data for identifying the welding system to be configured and to identify the operator. As shown here, the user is prompted to enter a serial number of the machine at data entry point 52 and a password at data entry point 54. If the user is intending to configure multiple units at the same time, the user can check an "enter multiple machines" check box 56. After all the information is entered, the user presses continue button 58 to move on to the next screen.

Figure 5:
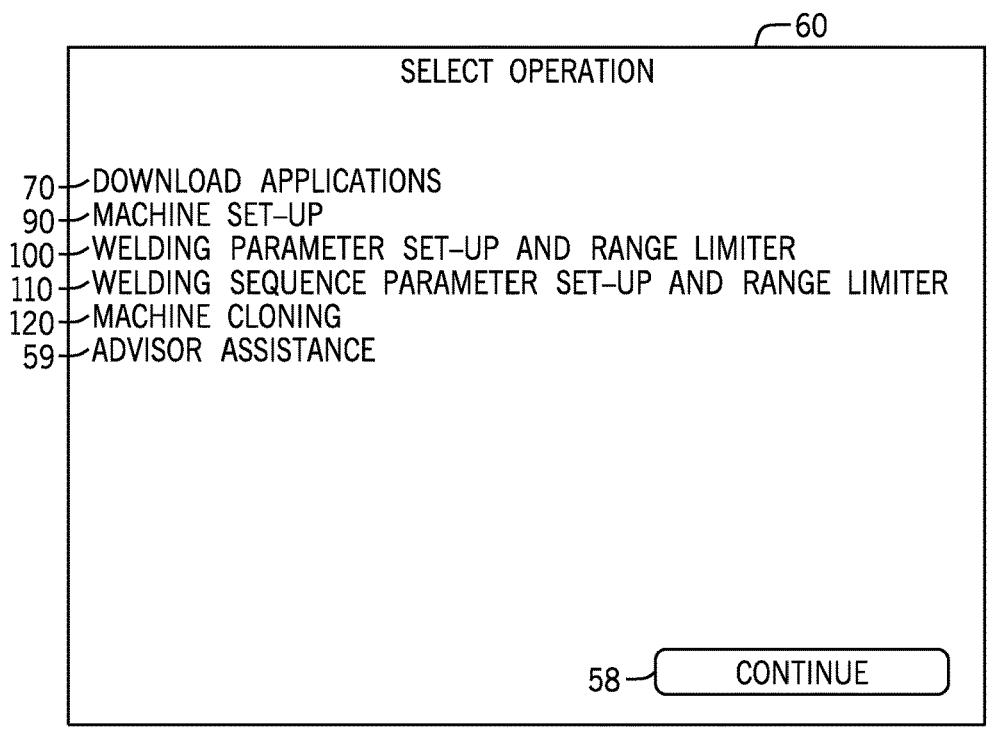
FIG. 5 is a screen shot of an initial menu accessible by the user to select an operation for configuring the welding system.

Referring now to FIG. 5, the user accessing the computer 31 is next prompted to select an operation from the operation selection or menu screen 60 that appears on display 44. As described above, here the user is prompted to select between a number of possible operations including downloading applications 70, machine setup 90, access welding parameter setup and range limiter functions 100, access welding sequence parameters and range limiter function 110, and access a machine cloning application 68. An advisor assistance screen 59 is available to explain operations to the user. The user can scroll through the available options, and when the appropriate selection is made, press a continue button 58 to continue.

Figure 6:
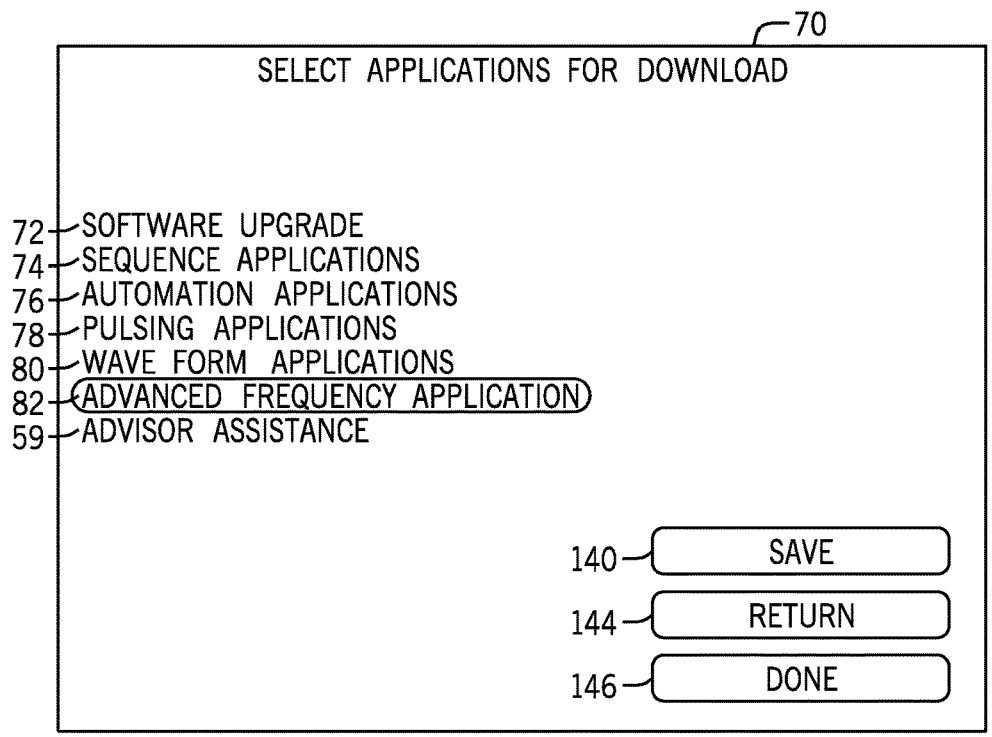
FIG. 6 is a screen shot of a screen for downloading applications to the welding system.
Figure 18:
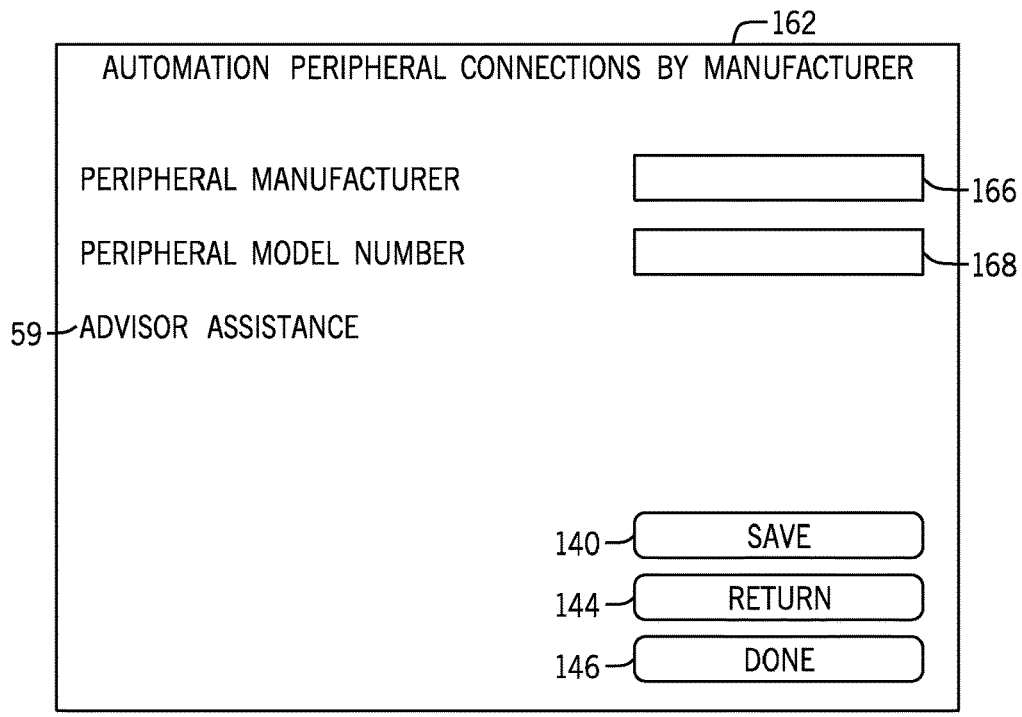
FIG. 18 is an exemplary screen shot of an application set-up screen for adding peripherals to the welding system for use as an automated system by identifying a brand and type.

Referring now to FIG. 6, if the user selected download applications 70 from screen 60, the user is provided with a number of possible applications to download to the welding system 10 to upgrade or add additional functionality for use by the controller 16 in welding system 10. These applications can include, for example, a software upgrade 72, weld sequence application 74, automation application 76, pulsing application 78, a wave form application, 80, and an advanced frequency application 82. In some applications, the user can be asked to purchase upgrades or features, and in these applications, access to provide credit card or other payment information can also be provided. Referring now also to FIG. 18, after the application or software has downloaded to the system 10, a download complete screen 148 can be displayed to the user, providing the option to review additional information about the downloaded software by access to advisor assistance 59 or to access assistance setting up the welding interface for the system 10 by access to an application set-up option 150. The user can also choose to return to the main menu 144, or exit the set-up process by activating the done icon 146. When the user chooses to proceed with the application set-up 150, the user can be directed to an informational or educational application set-up screen which can, for example, provide help for the user, as described below. The assistance provided to the user can, in some applications, be tailored to the experience level of the user, which can be determined either by questioning the user at the download computer screen 148, or by examining login credentials entered in login screen 50 and comparing against stored login credential data.

When the user selects the software upgrade 72 function, for example, the computer 31 retrieves software for upgrading the welding system 10 to the most recent version of existing software from memory 48. Here, because the user has provided machine identification, including the serial number of the machine, the computer 31 can identify the functions that were purchased and that are available on the existing machine, and locate the appropriate software for download. As described above, the software upgrade can be provided through communications system 32, interconnected communication systems 30 and 40 in welding system 10 and computer 31, respectively, or can be stored to a memory device and loaded into welding system 10 through a memory reading device. For example, the settings can be stored on a flash drive and added through a USB port, or on an SD card, as discussed above. After the user upgrades the software, the download complete screen 148 (FIG. 8) can be displayed, providing access to advisor assistance 59 and set-up assistance 150. The user can choose to review the advisor assistance, continue with set-up assistance 150, return to the main menu 144, or end the installation by accessing a done key 146. Here, for example, the set-up assistance could automatically make adjustments for implementing the software upgrade, or provide the user with suggested machine set-up or other adjustments based on changes to the welding system 10.

Referring again to FIG. 6, when the user selects sequence application software 74, computer 31 can download and store or transmit appropriate software for use by controller 16 in welding system 10 to control timed weld sequence functions, and store the application as a weld application 270 in memory 18. The weld sequence function can include, for example, controls that allow the user to select a pre-flow time, a post flow time, arc start or arc end parameters, and/or a weld time. Ability to program those parameters can be provided from computer 31, and can be stored on a memory device to be provided to welding system 10. Alternatively, the controller 16 can be provided with appropriate software to allow a user to program welding sequence parameters from user interface 32 in welding system 10, or from another remote device connected through communications device 30. The downloaded function can be stored as a weld application 270 in memory 18.

Figure 8:
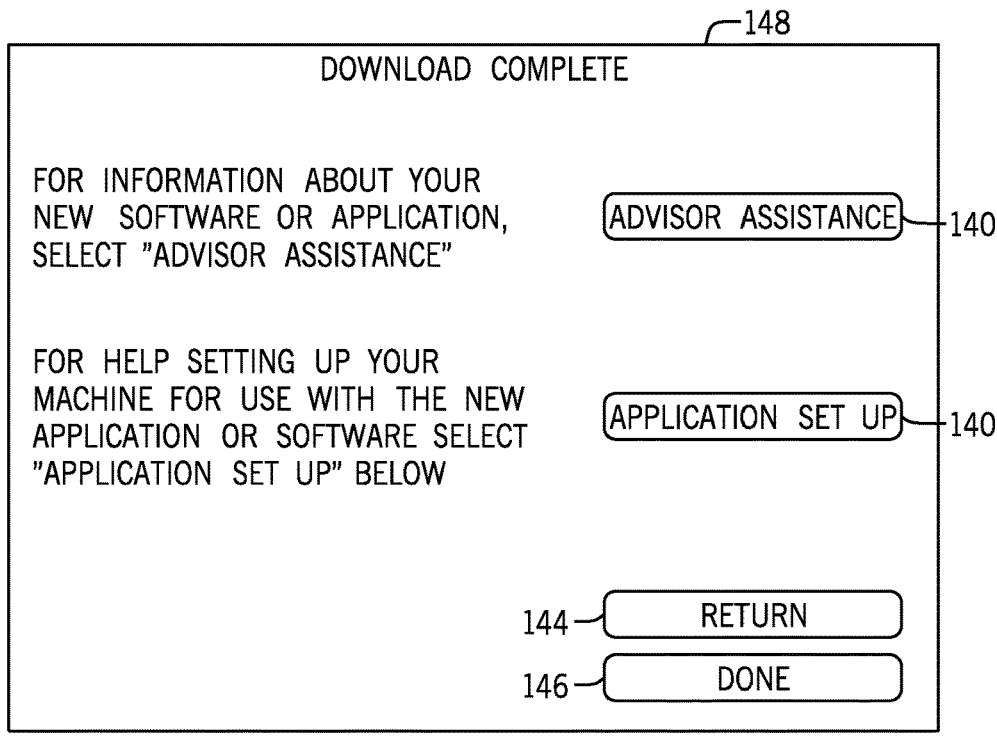
FIG. 8 is a screen shot of a screen illustrating a download complete and providing options to access an advisor function and an application set-up function.
Figure 9:
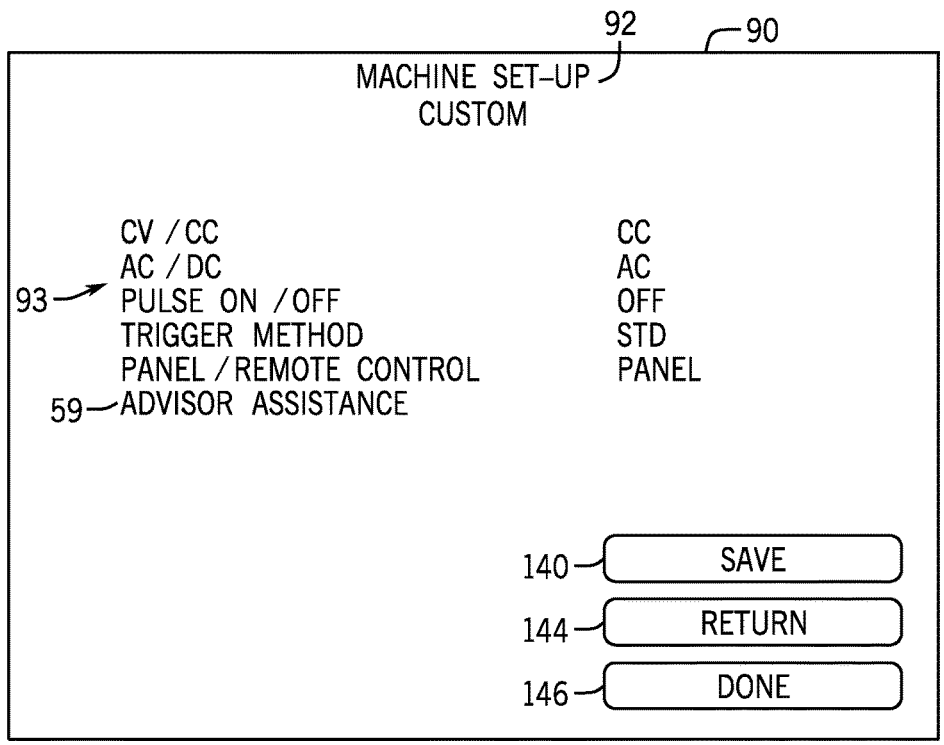
FIG. 9 is a screen shot of a first machine set-up screen allowing the user to establish individual machine set-up parameters.

Referring now to FIGS. 3 and 8, when the download of the required application software is complete, the download complete screen 148 can be displayed, prompting the user to access advisor assistance 59 describing, for example, the available sequencing parameters, and the effect that various choices have on a weld. Alternatively, the user can select the application set-up function 150, and here can be directed to additional educational data and to help in setting up the sequence through, for example, welding sequence parameter set-up/range limiter screen 110 described with reference to FIG. 14, below. The application set-up screen 150 can also, for example, direct the user to the machine set-up screens discussed with reference to FIGS. 9-12, below, to the weld parameter set-up and limit screen 100 described with reference to FIG. 13, or to other set-up processes. Here, for example, a "beginner" user can be directed to a machine set-up screen that chooses a weld process based on selected weld materials, as discussed with reference to FIG. 12 below, while an advanced user can be directed to a custom machine set-up screen, as shown in FIG. 9 below. Default weld parameters can also be suggested to the user.

Referring again to FIG. 6, the user can also be prompted to elect to download automation applications 76. Here, for example, computer 31 can download data or software code for use by the controller 16 and corresponding memory 18 to use the welding power source in an automated welding environment. The software code can, for example, unlock an existing I/O communications connector 17 (FIG. 1) to allow a user to access control signals and feedback signals for use by a connected automation controller. Similarly, the automation application 76 can unlock or provide a serial communications link or other link with communications device 30 in the welding system 10. As discussed above, an automated configuration could provide access to trigger the start of a weld or welding sequence, (contactor on (weld on), coolant on, high frequency on (HF on), gas valve on (purge), wire feed motor foreword (jog), wire feed motor reverse (retract), weld program selection, and touch sense detect); to obtain error condition feedback such as arc start errors, coolant flow errors, or gas flow errors; and provide access to analog input and output signals, including amperage command and feedback, voltage command and feedback, wire feed command and feedback, and current feedback; and provide other functions described above. Here, after the software is downloaded, the download complete screen 148 can provide access to an application set-up 150 that can inform or assist the user in peripherals such as fixed and flexible automation components to the welding system 10. The application set-up 150 (FIG. 8) can, for example, provide a series of questions about the type of peripheral devices being connected to the system, communications protocols used by external devices, and whether welding commands are controlled from the internal controllers in the welding system 10, or from an external device such as a robot 21. Again, the set-up information can be tailored to the experience level of the user, and advisor assistance 59 can be provided. A more detailed explanation of the process for configuring the system for automatic welding is discussed with reference to FIG. 23, below.

Figure 17:
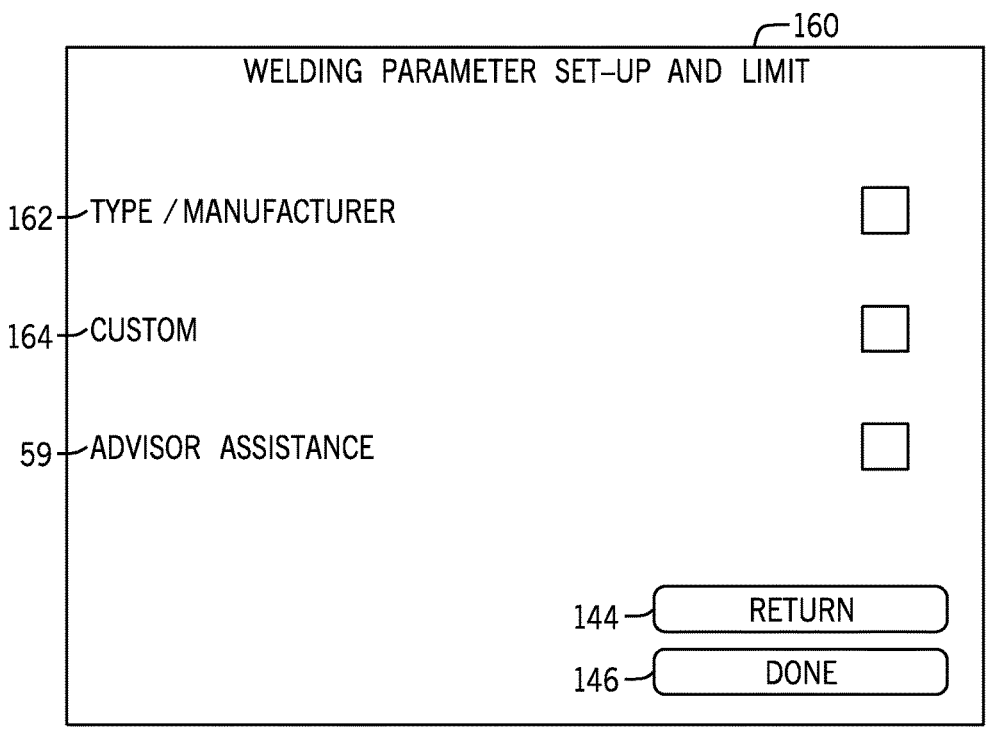
FIG. 17 is an exemplary screen shot of an application set-up screen for adding peripherals to the welding system for use as an automated system.
Figure 19:
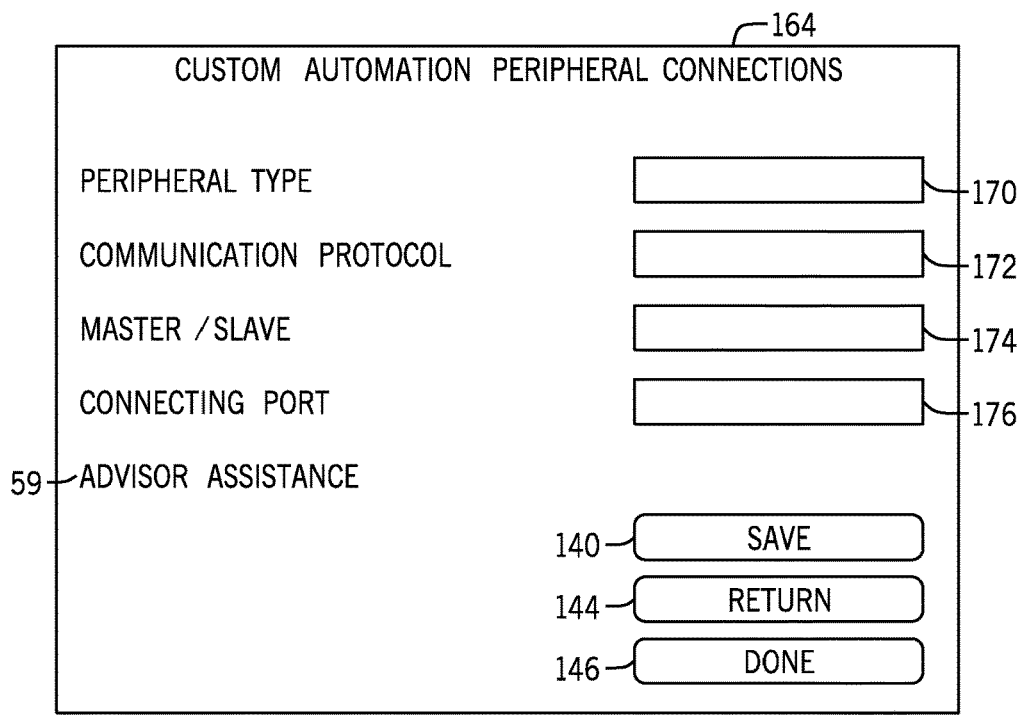
FIG. 19 is an exemplary screen shot of an application set-up screen for adding peripherals to the welding system for use as an automated system by identifying communications protocols, connection ports and other communication factors.
Figure 23:
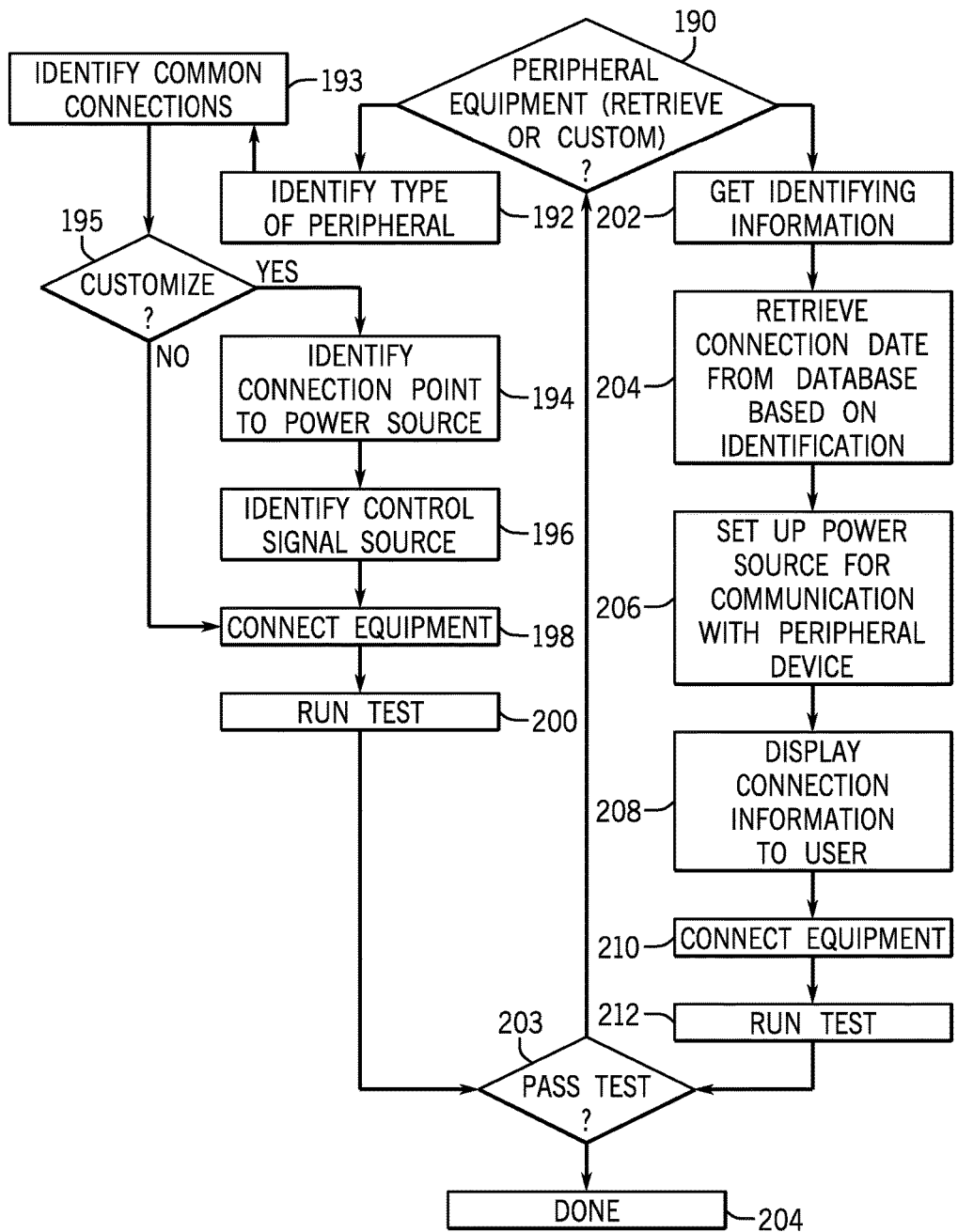
FIG. 23 is a flow chart illustrating a process for a peripheral equipment set-up selected from the menu of FIG. 22.

Exemplary screens illustrating application set up 150 for automated equipment are shown in FIGS. 17-19. Referring now to FIG. 17, in an initial screen 160, the user is prompted to select between identifying peripherals by a type and manufacturer by selecting type/manufacturer option 162, or to customize a connection set-up by selecting custom option 164. Advisor assistance 59 can be accessed to provide information to the user about the options, and to identify information that will be needed to connect peripherals before the user begins. Referring now to FIG. 18, when the type/manufacturer option 162 is selected, the user is prompted to enter information identifying peripherals to be connected to the system. The information can be, for example, the name of a manufacturer and a model number. Various other types of information for identifying the peripheral equipment, such as a serial number and type of equipment can also be requested. The manufacturer and model information can be, for example, stored in a database with configuration and communications data for connecting the identified equipment to the welding power source 12. After the peripheral equipment is identified, therefore, the appropriate communications and connection points can be identified for the user, and peripheral equipment 280, communication data 276, and control signal 278 data can be stored in memory 18, and the controller 16 in the welding power source 12 can retrieve this data to provide appropriate communications. Again, a flow chart illustrating exemplary process steps is shown at FIG. 23 and discussed below.

Referring now to FIG. 19, for a customized automation peripheral set-up 164, the user can be asked to provide identifying information such as a type of peripheral 170, a communications protocol 172, and a connecting port 176 for connecting the device to the welding power source 12. The user can also provide additional set-up information, such as master/slave information 174 identifying whether the connected device will act as a master control for the welding power source 12, or as a slave peripheral that takes commands from the controller 16 in the welding power source (FIG. 1). In some applications, command can be divided between the controller 16 in the welding power source and the connected peripheral device, and the interface can solicit information specifying command signals and identifying the source for controlling the signals. Although a relatively simple interface is shown here, it will be apparent that the custom automation peripheral connections interface could provide a number of embedded questions to be answered by the user to connect the peripheral device. These questions can, for example, be filtered based on the type of peripheral selected. A more detailed flow chart is shown below and discussed with reference to FIG. 23, below.

Referring still to FIG. 19, as shown here, to leave this process the user has the option to activate a save button or icon 140 to save the entered data, activate a return icon or button 144 to return to the main menu 60, or exit the system through done icon or button 146. In some applications, the user may also be provided with a "test" option, allowing the user to connect the peripheral to the system and to run an automated test of communications between the power source and the peripheral device. Advisor assistance associated with this screen can provide information about connection options, as well as visual images of connection points.

Referring again to FIGS. 3 and 5, the user can also elect to download a pulsing application 76 which either unlocks an existing function or provides software code to allow the controller 16 in welding system 10 to provide a GTAW or GMAW pulsed weld. Similarly, a waveform application 80 and an advanced frequency application 82 can be provided for use on a welding system 10 capable of providing an AC output. These applications can provide software which will allow the user to specify waveforms or frequencies in an AC TIG welding environment, or pulsed welding environment. The applications may provide pre-defined "canned" pulse parameter programs selectable from a user interface 32 in welding system 10, or allow an operator to select peak, background and frequency parameters from user interface 32 or from a remote device such as computer 31. After the download is complete, if the user chooses application set-up 150 (FIG. 8), the system can, again, select pulsing and waveform parameters using the "canned" programs, select parameters based on a weld material and joint or other parameters provided by a user, or customize a pulse or waveform including parameters such as peak, background, and frequency, and waveform parameters. As discussed above, the type of set-up can be based on user experience levels, login credentials, or individually selected by the user. Downloaded application can be stored in memory 18 as weld application 270, and canned pulsing programs as weld procedure data 274. Methods for selecting weld processes and procedures are described more fully with reference to FIG. 24 below.

Figure 7:
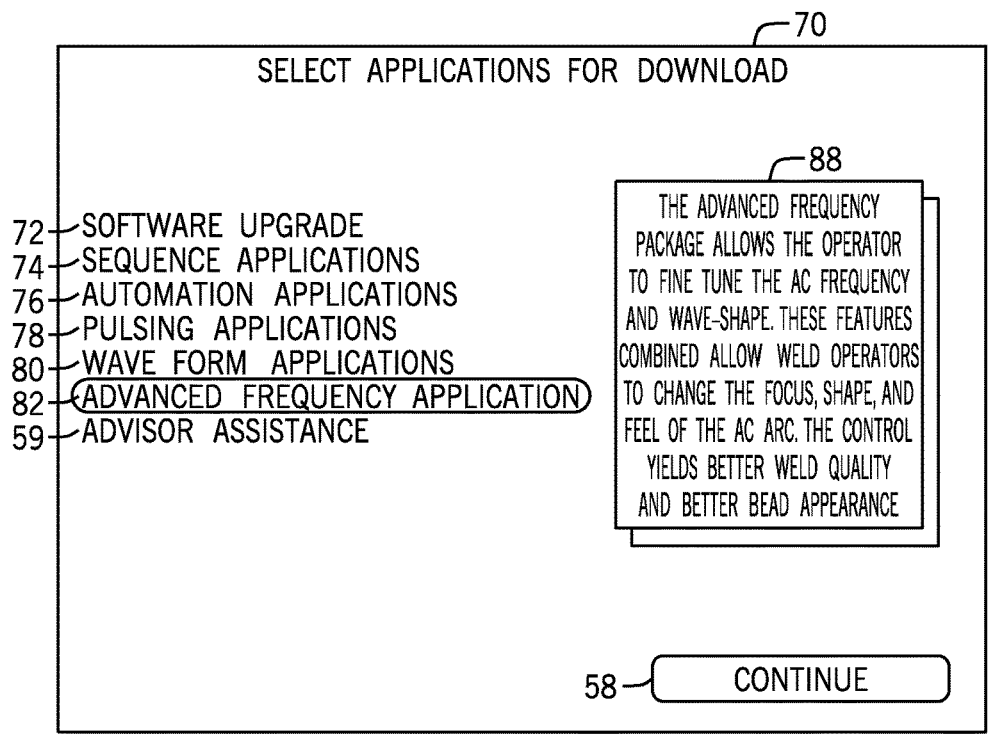
FIG. 7 is a screen shot of a screen illustrating an advisor function.

As described above, advisor assistance 59 is also provided to aid a user to select an application for download at screen 70. Here, when advisor assistance is selected, a window can be provided on display 44 including information to educate the user about the applications, and to provide suggestions regarding how and in what types of welding applications these functions would be beneficial. Referring now to FIG. 7, by way of example, when the advisor assistant button 59 is activated, and the advanced frequency application 82 is selected, an informational display window 88 or other window overlay on the display 44 provides information about the advanced frequency application, enabling the user to make appropriate selections for welding applications. Here, for example, the advance frequency application allows the operator to fine tune an AC frequency and wave shape to change the focus, shape, and feel of the arc.

Figure 10:
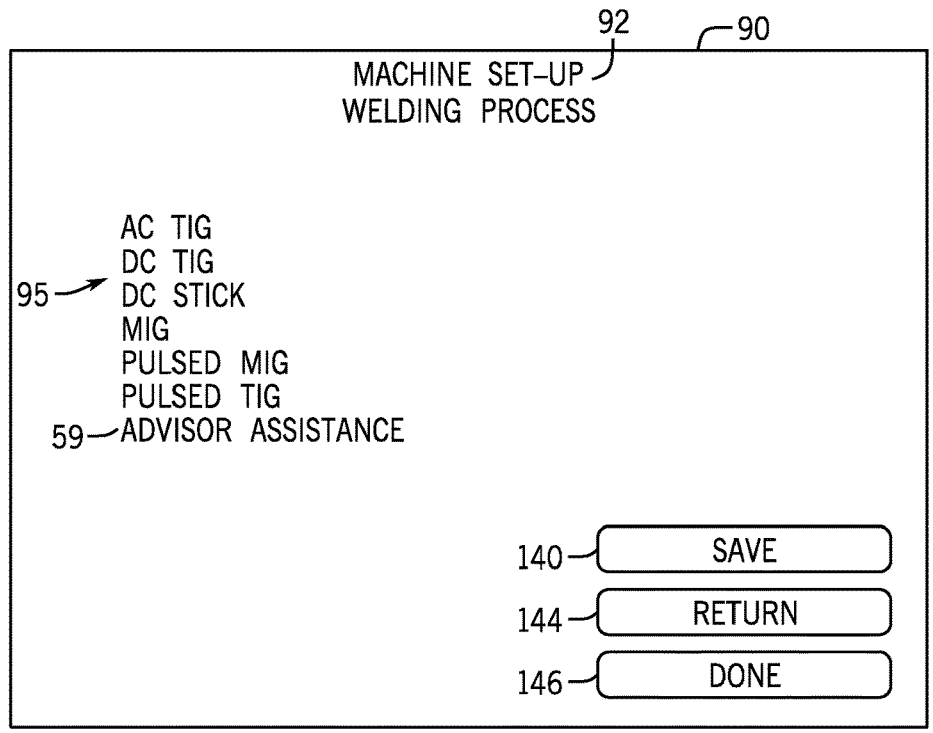
FIG. 10 is a screen shot of an alternative or additional machine set-up screen allowing the user to establish machine set-up parameters by selecting a welding process.
Figure 12:
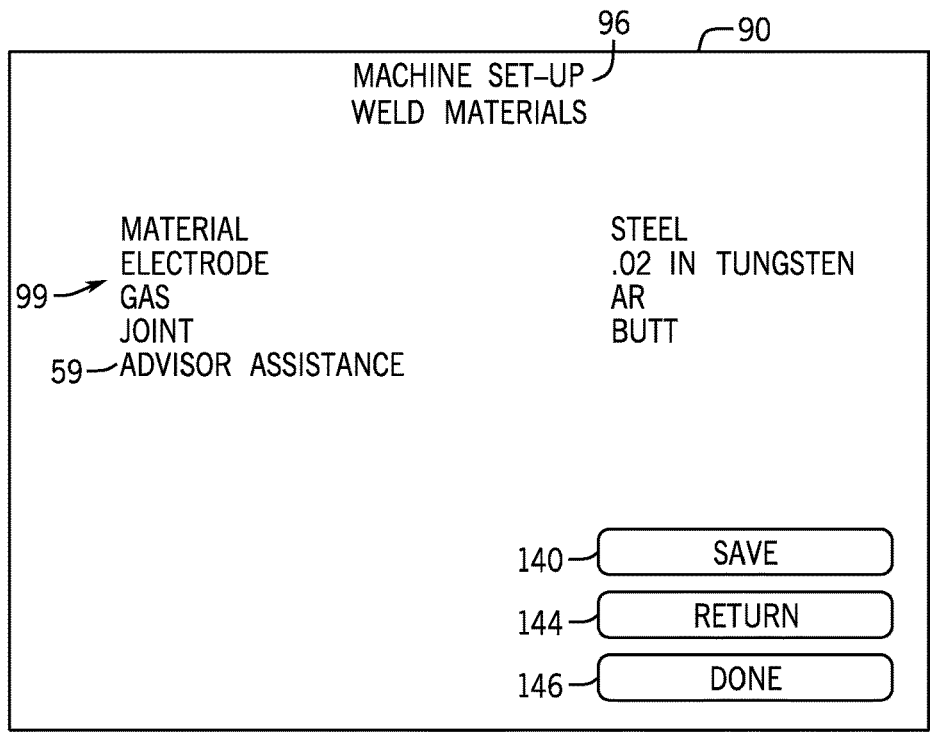
FIG. 12 is a screen shot of an alternative or additional machine set-up screen allowing the user to establish machine set-up parameters by selecting a weld based on materials, consumables, and weld type.

Referring again to FIG. 3 and FIG. 5, when the user selects or is directed to the machine setup 90 screen, the user is provided access to define setup or configuration parameters that can then be stored in memory 18 and accessed by the controller 16 in welding system 10. The parameters selected at the machine set-up screen are generally set once, to configure the machine for specific weld processes, or to select functions that are changed infrequently, such as a trigger type preference. Alternative screens for specifying a machine set-up function 90 are shown in FIGS. 9, 10, and 12. A flow chart illustrating an exemplary process is provided in FIG. 24, below. One or more of these alternatives or variations of these alternatives can be provided.

In FIG. 9, the display allows the user to specify a custom machine setup 92 in which the user individually selects machine configuration parameters 93. In a multi-process machine, for example, the machine configuration parameters 93 can include, for example, a constant voltage/constant current output power supply selection, an AC and DC output selection, a pulse weld on/off activation selection, a trigger method selection, such as momentary or a trigger hold, and a remote/panel selection which defines whether control of the power supply is provided from a remote device or the user interface 32 on welding system 10. Depending on the complexity of the machine, a user may be enabled to specify a number of remote access parameters. For example, selections can be provided allowing a user to specify a type of remote communications between the communication device 30 of welding system 10 and a remote control, and selecting a communication protocol such as RS232, RS485, Bluetooth, Ethernet, RF, cellular communications such as 3G or 4G, or other types of communication protocols which will be apparent to those of ordinary skill in the art. Selected data can be stored in corresponding location in memory 18 and recalled for use by controller 16.

Figure 11:
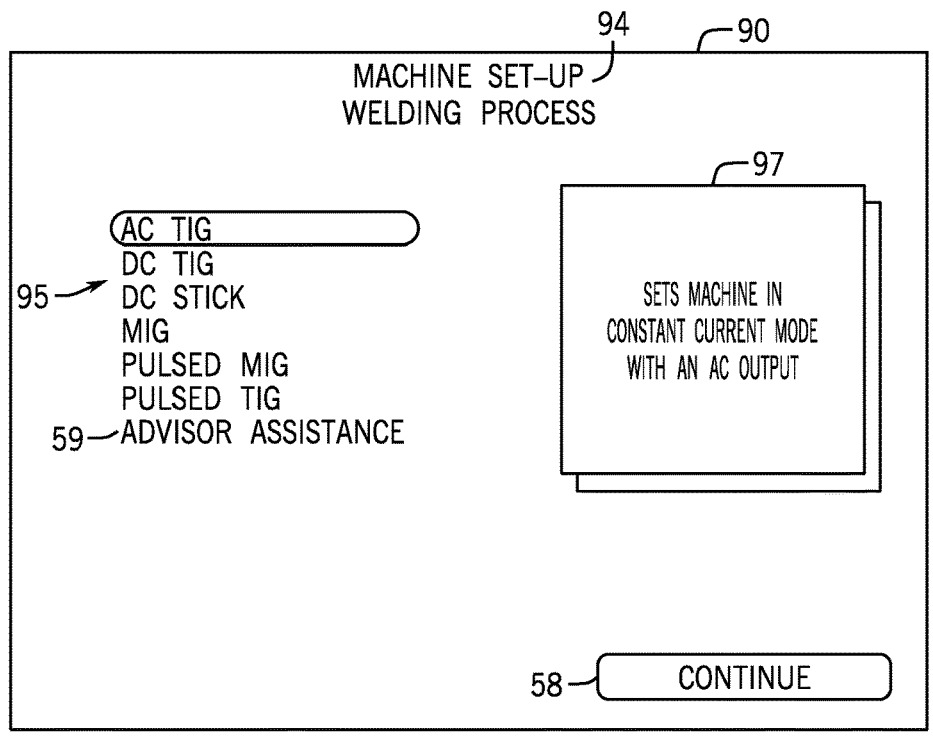
FIG. 11 is a screen shot of a screen illustrating an advisor function for the machine set-up of FIG. 10.

Referring now to FIG. 10, an alternate method for providing a machine setup 90 is illustrated. Here, rather than selecting individual machine characteristics, the user selects a weld process 94 to be used on the welding system 10 from a number of possible processes 95. After the process is selected, the computer 31 determines the appropriate machine setup parameter for download to memory 18 in welding system 10, here, for example, if the user selects AC TIG, the computer 31 establishes a configuration that includes a constant current power supply and an AC output. Additional customization options, such as trigger options, may be provided in another screen (not shown). As shown in FIG. 11, the user may also select an advisor function 59 to provide information about the selected weld process, and describing the corresponding machine set-up. Here, for example, a pop-up window 97 describes the machine set-up corresponding to the selected process. Information about the process, appropriate materials to be welded, and consumables to be used could also be provided.

Referring now to FIG. 12, in another alternative machine set-up option, a user is prompted to select a specific weld. The user can, for example, be prompted to select weld material parameters such as a material type and material thickness, a type of electrode, a type of gas, and other options, such as a weld joint. The computer 31 can access stored data either through an internet connection to a remote computer or server 41, or stored in memory 48, recommending a corresponding machine set-up (CC and AC) and/or process (AC TIG), retrieve data and provide an appropriate recommendation. Remote computer 30 can provide one or more acceptable option to the user. When more than one option is available, a second screen (not shown) could be provided to prompt the user to make a final selection between the available options. Selected options can then be stored as weld procedures in memory 18. Again, an advisor function 59 can be provided to aid the user in selecting between a number of different options suitable for the selected type of weld. The advisor can also provide recommended welding parameters and ranges for screen 100 of FIG. 13, as described below.

Referring again to FIGS. 3, 5, and 13, when the user selects the welding parameter set-up and range limiter function, a screen 100 on display 44 allows the user to identify minimum and maximum values for a number of different welding parameters 102, as well as a number of options suitable for use with the selected type of weld. For the AC TIG weld selected above, for example, the operator can specify welding parameters 112 including a minimum and a maximum amperage output of the welding power supply, a minimum and maximum balance value, select a type of waveforms such as square wave, sine wave, triangular wave, specify a frequency range extending between a minimum and a maximum value, and specify a selected wave shape. After selecting the minimum and maximum ranges, an operator using, for example, front panel or other controls from user interface 32 on the configured welding system 10 will be limited to a range between the minimum and maximum specified values, thereby increasing managerial control over the quality of the weld output and ensuring that a weld stays within prescribed limits. Limits can be stored with welding procedures 274 in memory 18 and can be correlated with the identity of an operator, a part to be welded, or other data identifying when the limits are to be applied.

Figure 13:
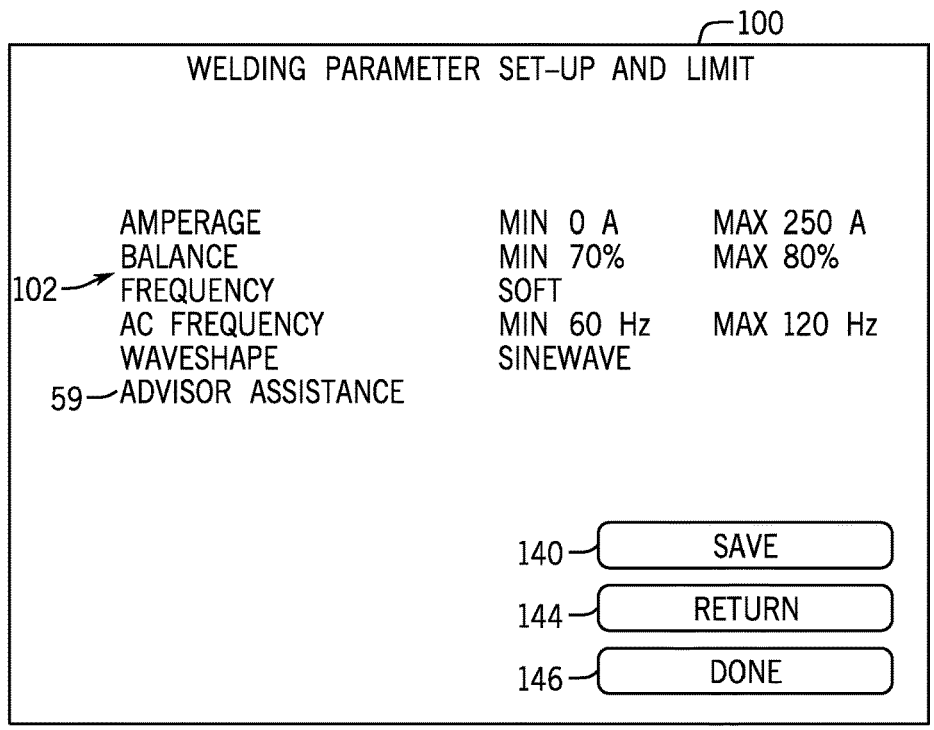
FIG. 13 is a screen shot of a welding parameter set-up and limit screen allowing a user to establish limits on weld parameters for operators.
Figure 14:
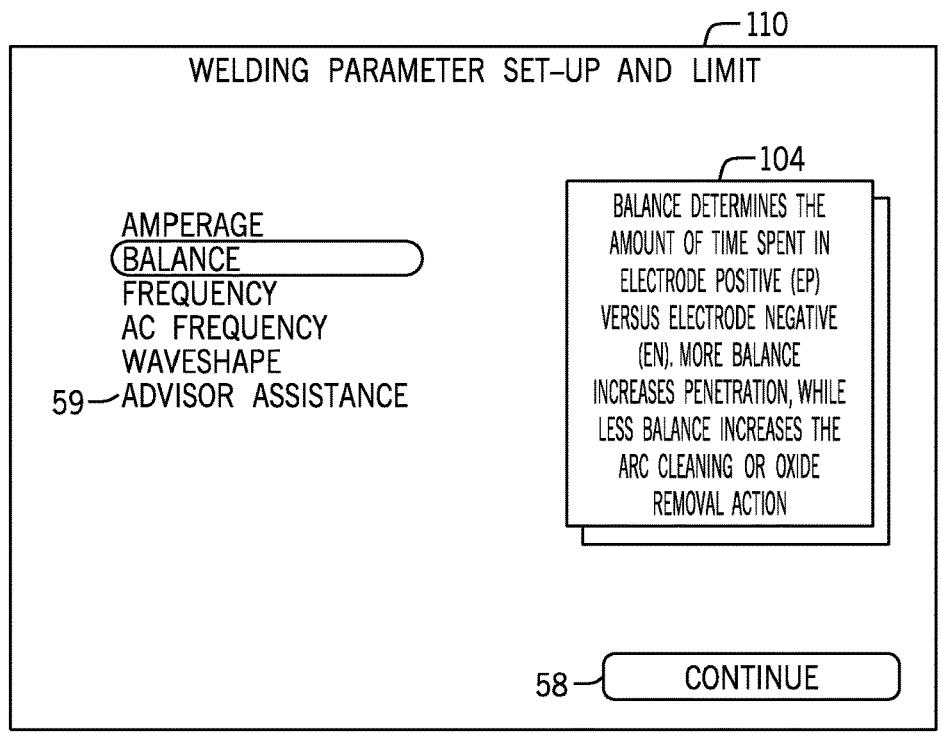
FIG. 14 is a screen shot of an advisory screen for the screen of FIG. 13.

Referring still to FIG. 13 and now also to FIG. 14, as described above, advisor assistance 59 can be accessed to provide educational information to the user. Here, for example, when the user selects "balance" and "advisory assistance," an informational window appears explaining that the balance determines the amount of time spent in electrode positive versus electrode negative during the AC pulse, and further that more balance increases penetration while less balance increases the arc cleaning or oxide removal action. Therefore, the user can select and access educational and informational data regarding the proper selections to be made for each of these selections, and can more easily determine how to configure the machine.

Figure 15:
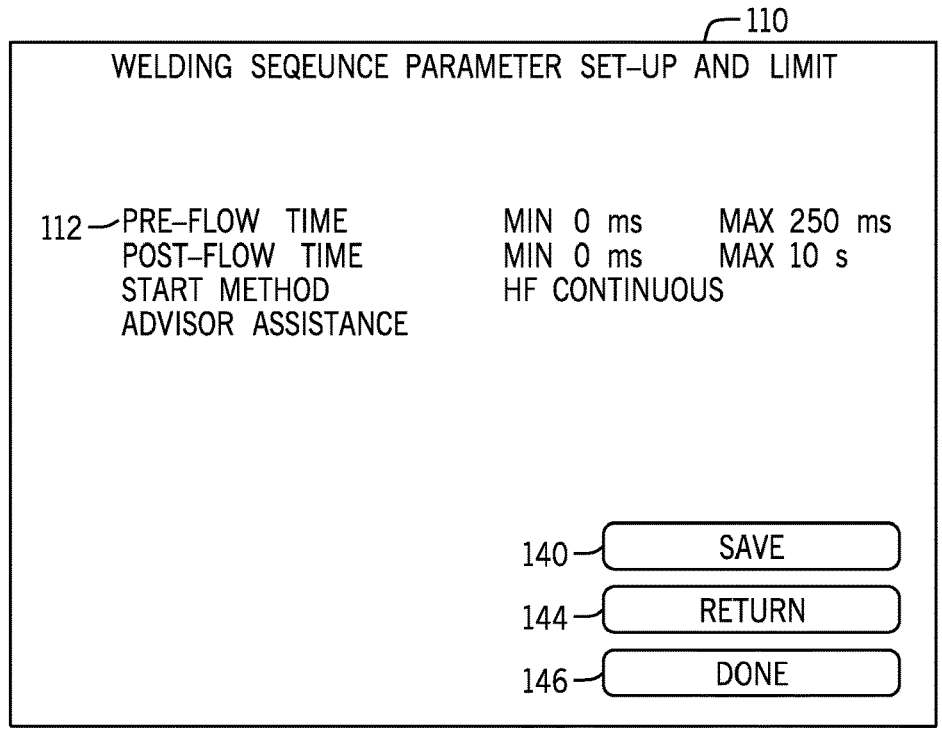
FIG. 15 is screen shot of a welding sequence parameter set-up and limit screen allowing a user to establish limits on weld sequence parameters for operators.

Referring now to FIG. 15, when the welding system includes a weld sequence application, or the weld sequence application is downloaded, as described above, a welding sequence parameter setup and limit screen 110 can be accessed. Similar to the screen described in FIG. 10, above, the user here is prompted to enter minimum and maximum limits for welding sequence parameters 112 such as pre-flow time and post-flow time. The user can also select between a number of user-selectable start methods, which can include, as shown here, HF start, continuous, and lift arc. As described above, advisor assistance 59 is available to provide assistance to the user. The computer 31 can also provide suggested sequence parameters for the steps based on weld materials, consumables, and joint configuration.

Figure 16:
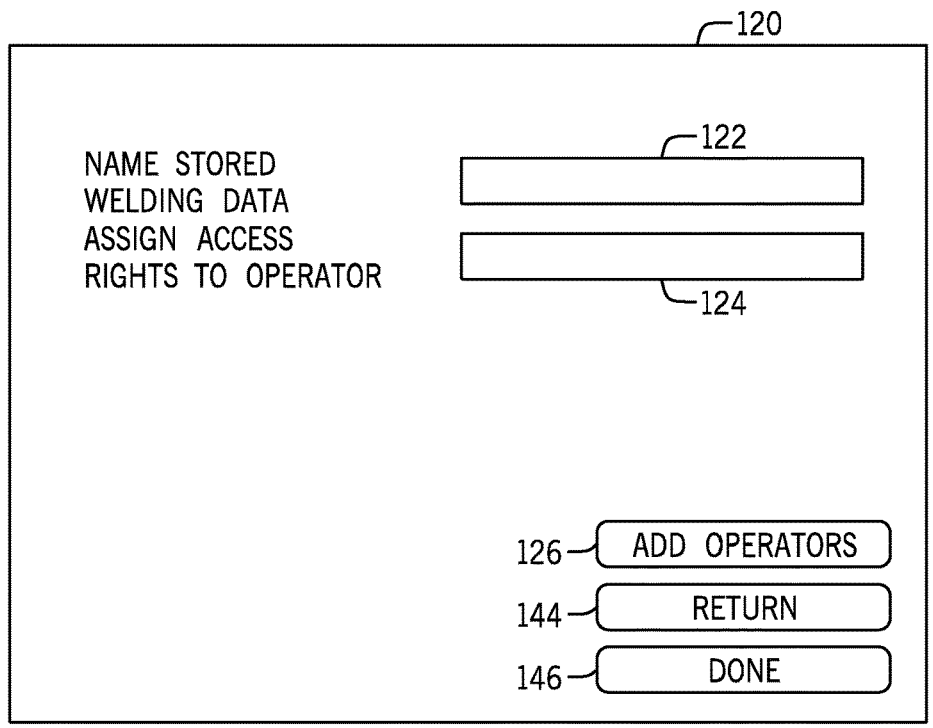
FIG. 16 is a screen shot of a "save" screen, enabling a user to name a configuration and assign access rights for the saved configuration.

Referring now also to FIG. 16, when a user saves machine set-up parameters, weld parameters, or weld sequence data, the user can be presented with screen 120 prompting the user to enter a name or other identifying data to correlate with the saved information in a text box, drop down menu, or other data entry port 122, and can also be prompted to enter data identifying operators who are granted access to use the specified data in another text box, drop down menu, or other data entry port 124. This data can be stored in memory 18 (FIG. 1) and can also be stored to a memory storage device. As shown here, to exit this screen, the user is given the option to grant access to additional operators 126, return to the main menu 144, or exit the system 146.

Figure 20:
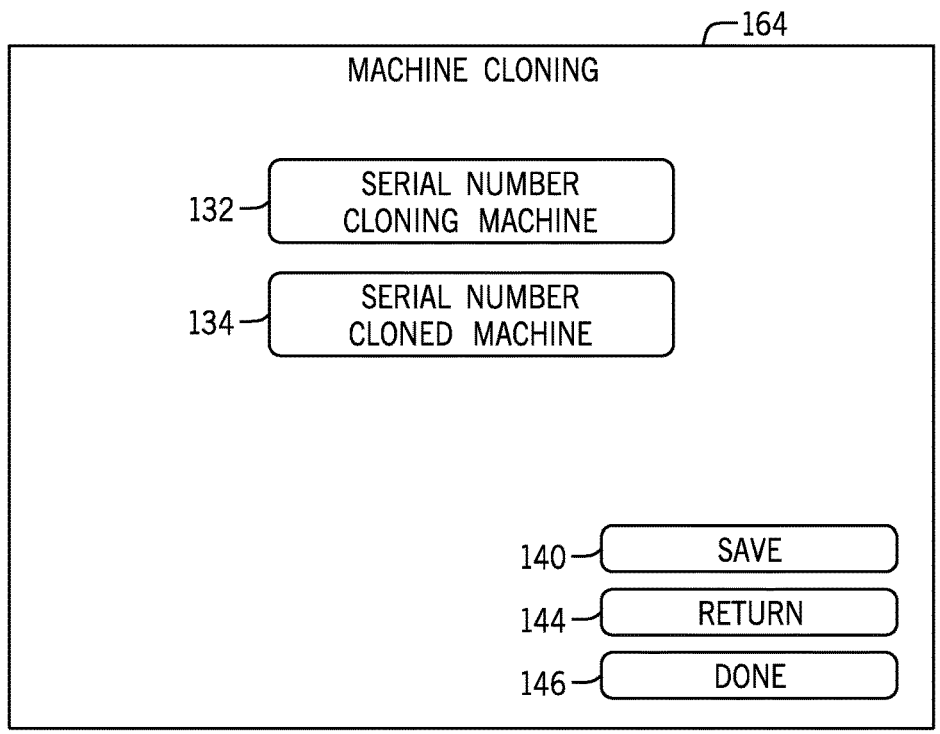
FIG. 20 is a screen shot of a machine cloning screen allowing a user to copy a configuration from one screen to another.

Referring again to FIGS. 3, 5, and 20, when the user selects a machine cloning operation, screen 130 appears on display 44. The user is prompted to enter a serial number of a configured machine to be copied or cloned in data box 132, and the serial number of a machine the user wants to configure with the same configuration box 134. After the appropriate serial numbers are entered, the user can select a the save button 146 and copy the configuration from the first machine to the second machine. Again in order to return to the main menu, the user selects a return button 144. To exit the machine configuration system, the user can select the done button 146. A "multiple units" check box could also be provided, as described with reference to FIG. 4, above.

Figure 22:
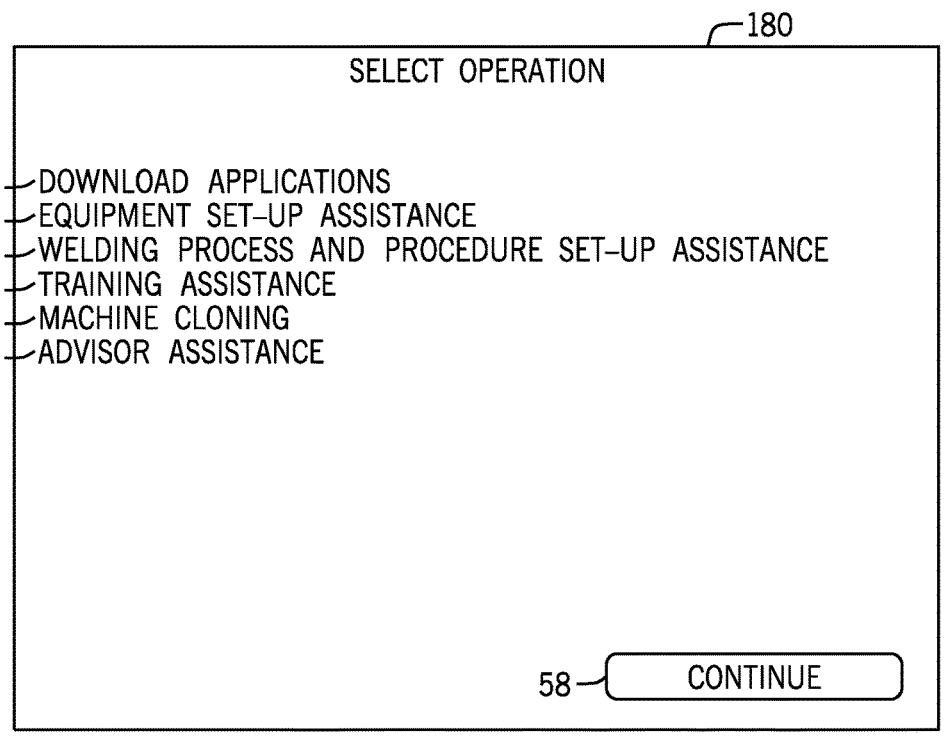
FIG. 22 is a screen shot illustrating an initial menu for the embodiment of FIG. 21.
Figure 21:
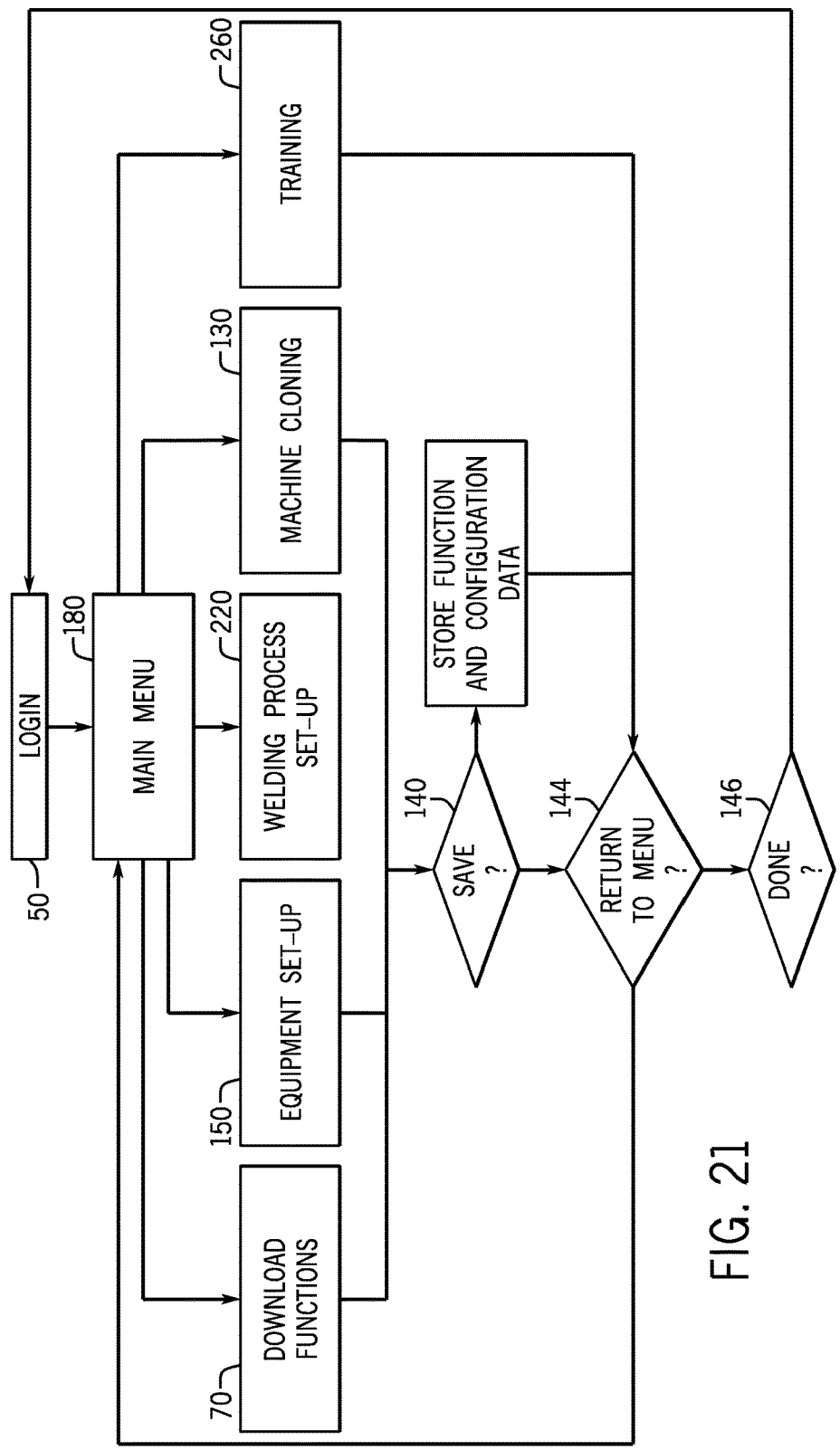
FIG. 21 is a flow chart illustrating an alternate machine set-up procedure.

Referring now to FIGS. 21 and 22, although the set-up assistance function 150 has been described above with reference to application downloads, in an alternative arrangement a user can access equipment and welding process set-up assistance through a main menu 180. As shown here, for example, a user is provided with options to download applications or functions 70, or to activate a machine cloning function 130, as described above. The user can also select an equipment set up 190 option, a welding process set up 220 option, and a training option 260. As described above, these processes can be accessed through a connected computer device 31, or, in some applications, from an embedded system within the welding power source.

The equipment set up selection 190 can provide access for the user to set up peripheral equipment for connection to welding power source 13 and system 10 as described with reference to FIGS. 17-19, above, and with reference to FIG. 23 below. During the equipment set-up selection 190, the user can be asked a series of questions or select between possible options for connecting a number of different types of peripheral equipment including automation equipment, such as robots and other types of flexible automation, vision systems, seam trackers, and fixed automation components; semi-automatic equipment, including various types of wire feeders and controllers; and other types of peripheral devices including fixtures, limit switches, cooling systems, gas meters, wire monitoring equipment, and other types of equipment and devices. Instructions for installing or connecting other types of equipment, including, such as weld cables, voltage sensing devices, current sensing devices, remote control devices, high frequency starters, and factory options intended for installation on the power supply, and other types of equipment can also be provided. Instructions for connecting consumable supplies, including gas wire, and wire can also be provided either as part of equipment set up or a training function, described below.

Welding process set-up 220 can include, for example, machine set-up as shown in FIGS. 9-12, as well as the welding parameter set-ups shown in FIGS. 13-17, welding sequence set-up as shown in FIG. 15, and other applications. In some applications, particularly useful for beginning welders (step 221, FIG. 24), or when a quick process change is required, the user can be prompted to identify a various combinations of variables including weld joints, orientations, torch angles, travel speed, welding process, weld materials, gas, wire size, wire type, electrode, and command levels, the process can select a best welding procedure for the selected parameters, or provide a series of welding procedure options to the user. Weld data corresponding to variables entered by a user can be for example, stored in a database in memory 18 or in a database corresponding to an external computer 31 or 40 and indexed for retrieval. Various algorithms for correlating variables and selected parameters can be used as will be apparent to those of ordinary skill in the art. During the selection process, the user can, for example, access advisor screens describing the variables, and any options presented to the user, along with the relative advantages and disadvantages of the options, or other descriptive information. In other applications, the user can select a welding process (step 225, FIG. 24), and the welding power source can be set up for the appropriate process, provide information about peripherals and consumables for the process, and, in some applications, recommend welding power source output parameters, such as voltages or amperages. An advanced set up option for customizing all settings can also be provided (step 223, FIG. 24).

Referring now to FIG. 23, a flow chart illustrating an exemplary peripheral set up is shown. When a user selects equipment setup assistance 190, the user can be given options for connecting and testing equipment. In a first option, the user can identify the peripheral for connection to the system from a database of stored data (steps 202-212). Secondly, the process can prompt the user to identify a type of peripheral, and then provide a series of common options for connecting the peripheral, and prompt to user to select a setup (steps 192-198). Finally, the user can be prompted to enter connection and communication data for a for a completely customized setup (192, 194, 196, 198). Similar set-ups are discussed with reference to FIGS. 17-19, above.

If the user chooses to identify the peripheral equipment from stored data, the process prompts the user to provide identifying information (step 202), which can be, for example, a manufacturer and brand name, manufacturer and SKU number, or other types of identifying data. Options can, for example, be provided in a drop down menu. If the equipment is not found in the database, the user can be directed to a customized setup (steps 197-200).

If the defined equipment is found in the database, in step 204, the process retrieves data from a database which can be stored in computer 31, in an external computer 41, or in the memory 18 in welding system 10 (see FIGS. 1 and 2). The retrieved data identifies type of equipment connection, communication protocols, and other data required for connecting the peripheral equipment specified in step 202 to communicate with controller 16 in the welding power source. Appropriate communication protocols, control signal data, and peripheral equipment data and advisor assistance is provided to the user for help in connecting the equipment, and can be stored in memory 18.

In step 206, the set-up process stores the data necessary to activate communications between the controller 16 and the selected peripheral device through, for example, communications device 30 or the I/O communications connector 17, in memory 18 of the welding power source 12. In step 208, the process can display connection information to the user, advising the user where and how to make wired or wireless communications and other connections to the welding power source 12. These displays can include graphics illustrating where the connection points are found on either the welding power source or the peripheral equipment. In step 210, the computer 31 can prompt the user to connect the peripheral equipment to the welding power source 12, and then wait for input from the user indicating that the connections have been made.

In step 212, the process can selectively activate a test to verify that wired or wireless connections were made appropriately and that communications have been established with the peripheral device. The test can, for example, temporarily activate control signals from controller 16 and communications device 30 and input/output connector 17 in power source (FIG. 1), instruct the user to activate control signals from the peripheral device, or activate switches or other connected devices, and monitor feedback from the peripheral device at the communications device 30 or I/O connector 17 to verify that communication have been properly established between the devices. In some applications, these steps will be performed automatically, and in some applications verification from the user will be requested. If the peripheral device connections and communications pass the test, the process is completed at step 204, and the user can be prompted to use the welding system 10 including the peripheral equipment, or to request further assistance providing feedback on using the peripheral equipment. If the peripheral device does not pass the test, the process can return to step 190, where the user is again allowed to choose between identifying the peripheral from stored data, or providing customized connection information. Before starting again at the main menu 180, a user can be provided with a display screen listing the entered data and providing an opportunity for the user to change the input. If the equipment passes the test, the selected parameters are stored on the appropriate location in memory 18, and the user can be prompted to proceed to use the equipment with the aid of advisor assistance 59 if required.

Referring again to FIG. 23, if the user chooses the custom setup, initially the user can be prompted to identify a type of peripheral to connect to the welding power source 12 (step 192). The peripheral can be, for example, a robot 21, PLC 27 (FIG. 1), other types of flexible or fixed automation components, wire feeders, or other devices, and a list of these types of devices can be provided to the user through a drop down menu, the user can be prompted to select between a displayed list, or can be prompted to enter the type of equipment into a text box, and these contents can be compared to stored data. Once identified, the type of peripheral device can be used by the process 190 to filter additional questions presented to the user to obtain additional connection information.

After the type of device is identified, the user can be provided with options detailing a series of pre-defined connection set-ups defining commonly used connection points, communications protocols, and control signals for the identified peripheral (step 193), and be prompted to select an option. For example, when a robot is connected as a peripheral device, the user may be given the option of receiving a start/stop command from the robot and controlling the weld (volts, amps, wire feed speed, etc.) from the controller 16. In other applications, start/stop and weld control levels can be provided by the robot, and sequence timing can be provided by the controller 16. In some applications, all command and control signals, can be provided by the robot and feedback signals can be provided to the robot from, for example, I/O connection 17 in the welding system 10.

If the user would prefer to customize the connection, the user can proceed to a customized set-up (step 194), which can prompt the user to identify a connection point on the power source 12 (step 194), such as communications device 30 or IO connector 17 (FIG. 1) for connecting the peripheral, and a communications protocol for use. Again, available communications protocols and connection points may be provided to the user through drop down menus, through text entries compared to a database, through displayed data with corresponding text boxes, or in other ways that will be apparent to those of ordinary skill in the art. The defined communications protocol can include, for example, discrete digital input and output signals, analog command and feedback signals, serial communications using RS-232, RS-485, or other communications protocols, IEEE 802.11 Wi-Bluetooth, Ethernet, RF, cellular communications such as 3G or 4G, parallel communications, or other wireless or wired communications systems. If a communications protocol is requested by the user that is not already resident in the welding power source 12, the process can provide the ability to download software, and, when necessary, may also provide the option to purchase hardware, adapters, and/or instructions necessary for installing hardware to complete the desired communication system.

In step 196, the user can identify the control signals to be communicated between the peripheral device and the controller 16 in welding system 10. For example, in some applications, a peripheral device may require a start or stop signal from the controller 16 in welding system 10. In other applications, the start/stop signal may be provided to the controller 16 from the peripheral device. The user can identify which command signals originate from controller 16 and the attached peripheral devices, and can therefore also identify which devices are masters or slaves in the system, and store this information in memory 18 in the power source 12. The user can also identify weld status, error, and other output signals to be provided to the peripheral equipment. As discussed above, these signals can include trigger or weld start signals to the start of a weld or welding sequence, (contactor on (weld on), coolant on, high frequency on (HF on), gas valve on (purge), wire feed motor foreword (jog), wire feed motor reverse (retract), weld program selection, and touch sense detect); error condition feedback such as arc start errors, coolant flow errors, or gas flow errors; and provide access to analog input and output signals, including amperage command and feedback, voltage command and feedback, wire feed command and feedback, and current feedback; and other functions described above. Where analog signals are used, voltage or current levels and corresponding expected output values can also be identified and stored. For example, an analog input signal of 10 volts on a selected input line could be defined as a request for a 300 amp output from the welding power source 12. The selected connection set up can be stored in memory 18 at power source 12 and accessed by controller 16.

At step 198, the user is prompted to connect the equipment to the power supply at the specified location. The prompt can include, for example, figures and diagrams illustrating the connection points. At step 200, the user can be prompted to selectively run a test to verify that the communications and connections are working properly. When the user chooses to perform the test, the controller 16 in welding power source 12 can retrieve the stored set up data from memory 18 and activate output signals testing activation of corresponding functions in the peripheral equipment, and can monitor input communications and lines to verify appropriate communications. At step 203 the user can be prompted to indicate whether the test has been successfully completed. If the test is successful, the process enters the done state 204. If not, the process can again return to step 190. Although as shown here, step 190 begins a second pass through the set-up process, after a failed test, the previously entered data could be displayed on computer 31. The user could then be prompted to verify that data and to change or correct the previously entered data. After the data is corrected, the user can then be prompted to re-run the test.

Figure 24:
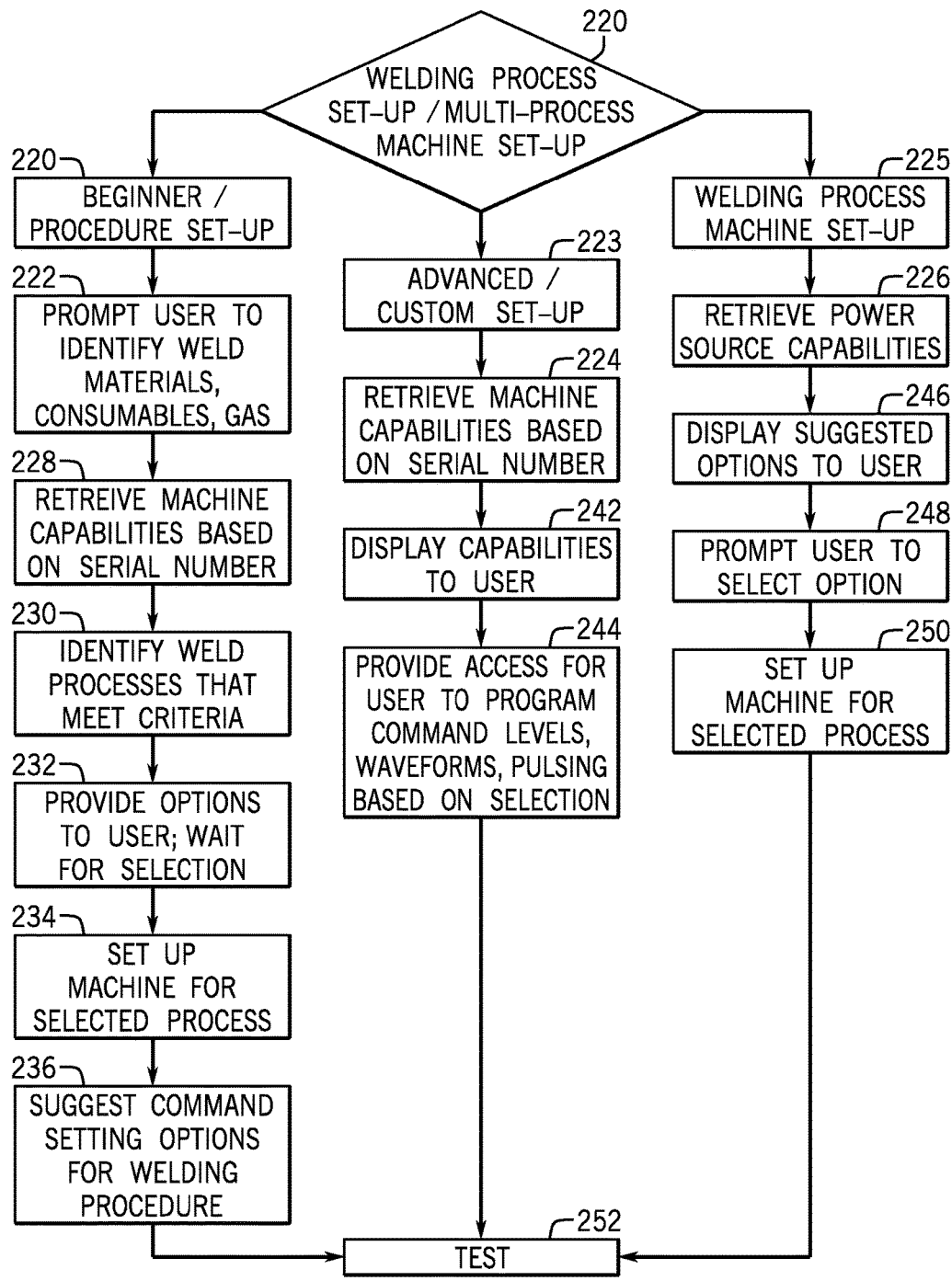
FIG. 24 is a flow chart illustrating a process for welding process set-up selected from the menu of FIG. 22.

Referring now to FIG. 24, a flow chart illustrating steps for automating set-up of welding process and welding system machine set-up parameters is shown. As shown here, three different levels of set-up help are provided. The beginner or fast set-up routine 221 is intended for a user with limited welding knowledge, or to set up equipment quickly for a known weld. Here, the process 220 can prompt the user to select or enter various types of welding process data and/or preferences from the user, and, based on the input data, can select a welding procedure, including a welding process, a machine set-up, or other settings, or provide suggested settings to the user, and prompt the user to make a final selection, as described below.

The welding process set-up routine 225 allows a user to select a welding process based on retrieved data defining the capabilities of the machine. After a welding process is selected, other data, such as joint type, torch orientations, materials, consumables, etc. can be individually selected by the user, or the user can request help in selecting these parameters by way of advisor assistance 59, as discussed above, or by activating another set-up routine similar to the one discussed above.

The advanced set-up routine 223 is intended for use by a more advanced user, and allows the user to establish custom parameters. Here, machine capability data can be displayed to the user, and the user can be granted access to select the welding process and machine set-up parameters. The user can access assistance through the advisor 59, which may provide proposed welding processes, welding power source voltage or current output commands, wire feed speeds, sequence parameters, pulse parameters, and equipment including high frequency starters, and other devices.

Referring still to FIG. 24, at an initial step 220, the user can be prompted to identify a weld (material to be welded, consumables, joint type, or a subset of these parameters) (step 221), to identify a process type (TIG, MIG, pulsed MIG, AC TIG, etc.) (step 223), or to customize a welding process (step 225). These options can, again, allow users of different skill level to successfully select processes.

Referring first to the material type selection 221, at step 222 the user is prompted to identify data useful in selecting a weld process, corresponding power source output values, and other types of data that can affect the weld. The data can include various combinations of weld joints, orientations, torch angles, travel speed, weld materials, gas, wire size, wire type, electrode. In step 228, the process retrieves welding power source machine capability data based on the serial number of the power source, which was entered during the login process, or which could be retrieved from memory 18 in a connected power source 12. The machine capability data can identify, for example, whether the machine is capable of CV operation, CC operation, has pulsing capabilities, AC output capabilities, or other types of specialized programs. In step 230, the system accesses a database, which can be stored in memory 18 in power supply 12, in computer 31, or by access to remote computer or memory storage 41 as shown in FIG. 2. The process 220 can access stored welding process data including "canned" progress, and can identify either a single best process, or a number of options for the user as shown in step 232. If options are provided, the process 220 can display the options and wait for a selection by the user. The user can, for example, select two or more options, and save these options as programs to the memory 18 in power supply 12 for accessing controller 16, or to a memory storage device adapted to be received in a connector in the welding power source.

After a selection by the user, or automatically if no options are provided, in step 234, process 220 can select the appropriate machine setting CC (constant current) or CV (constant voltage) output, AC or DC operation, pulse parameter, etc. in power source 12 by providing appropriate data to the controller 16 and memory 18. In step 236, the process 220 can provide appropriate expected command and welding power source voltage, current, or other output levels to the welding power source 12, or provide a plurality of options that can be selected by the user. The user can, for example, select one or more of the presented options, store the programs in memory 18 in power supply 12 or on a memory device adapted to be connected to the power supply 12. The user may also be given the option to set range limits for the command values, as described above with reference to FIG. 15. Level of customization can, again, be based on the skill level and credentials of the user. If the welding power source includes sequencing capabilities, the process 220 can include recommended sequence times and command levels.

Referring again to FIG. 24, if the user has identified a welding process type to be implemented on the welding power source 13 (MIG, TIG, pulsed TIG), the process 220 can set up the welding power source for performing the selected process. Here, in step 226, the computer 31 can again retrieve information about capabilities of the welding power source 12 based on a serial number or other identifying data. In step 246, the possible options can be displayed to the user, and the computer 31 can prompt the user to select an option (TIG, MIG, AC TIG, Pulsed MIG, etc.). Finally in step 250, the computer 31 can access controller 16 in welding power source 12 and store the appropriate machine set-up parameters in memory 18. The selected weld process parameters can include a CC/CV selection, AC or DC operation, and pulsing parameters or waveform settings. Here, therefore, a multi-process welding power source 12 can be set up for the appropriate type of weld, and command levels can be selected by the user. Alternatively, the user may be given the option to identify a weld material and joint, and the computer 31 may select an appropriate welding process as described above.

Referring still to FIG. 24, if the user chooses instead to customize a program (step 223), initially the capabilities of the welding power source are retrieved at step 224, as discussed above. At step 240, these capabilities can be displayed to the user (CC/CV, AC, pulsing, sequencing, etc.). Finally, in step 242 the computer 31 can provide access for the user to program command levels, waveforms, and pulsing parameters based on the selection made by the user. The selected programs can then be stored in memory 16 in power source 12.

Referring still to FIG. 24, after the setup is complete, the user can be prompted to run a test weld to verify effectiveness of the program. Here, for example, assistance could be provided to the user indicating consumable choices, connection points for connecting additional suggested equipment such as high frequency starters, gas, wire, electrodes, and weld cables.

Referring again to FIG. 22, if the user chooses training 260, the user can be provided with a menu providing access to various types of training related either to downloaded applications, connected peripheral equipment, equipment set-up or weld process training. After a new application is downloaded, for example, a tutorial providing instructions on use of the application can be provided. After peripheral equipment is connected, a tutorial on using the equipment can be provided. Further, after a weld process or procedure is selected, training for using the selected procedure can be provided. For example, the user can be prompted to run a weld, and graphics or pictures of a weld run using the selected process and at the selected output parameters can be provided for comparison. Various other training processes could also be provided.

The disclosed system therefore provides a significant advantage over the prior art by providing a highly flexible configuration system, which allows a high level of customization for end users, while simplifying the process of setting up equipment so that users of different classifications and skill levels, can successfully set up the welding power source and peripherals (perform a successful weld.) The disclosed system also increases efficiency by optimizing capital equipment, allowing the same piece of welding equipment to be easily reconfigured for use in hand-held and automated systems, and limiting the need for multiple types of welding systems. The disclosed system also enables a user to add features to existing systems to re-purpose the power source when welding procedures change. Further, the system allows management personnel to easily establish operator limits and acceptable ranges for welds, and provides the ability to record and recall configurations and to configure multiple power sources to provide output in these ranges.

In one example, the system of the present invention can be advantageously used to re-configure a "base" unit power supply generally intended for manual welding to a power source useful in an automated welding cell. Here, for example, the user downloads the appropriate code to a memory storage device, such as a flash drive or SD card. The memory storage device is then received in the communications device 30, which here is a reading device capable of reading the information stored on the memory storage device. As described above, the data stored on the memory storage device can be transferred to memory 18 in welding system 10. The controller 16 uses the downloaded data to re-configure the power source to receive trigger signals and command signals from an external system, such as PLC 27 or robot 21 in FIG. 1, from a system connected to an I/O connector 17, or to another system transmitting data to the power source through communications system 30 using, for example, Wi-Fi, RS-232, RS-485, Bluetooth, Ethernet, RF, cellular communications such as 3G or 4G, or other wired or wireless communications systems.

In some applications, the controller 16 can be programmed to remain in an automated mode only when the memory storage device storing the automation data is in the reading device in communications system 30. In other applications, after the data is downloaded, the memory storage device can be moved to and inserted in a read device in another welding power source, and the data again downloaded. In systems where a number of power sources are networked together, the data can be downloaded to each of the welding power sources in the system. In other applications, each memory storage device contains serial number data and can be used only once.

It should be understood that the methods and apparatuses described above are only exemplary and do not limit the scope of the invention, and that various modifications could be made by those skilled in the art that would fall within the scope of the invention. For example, although an exemplary welding system is described above, this welding system is shown by way of example only. As described above, there are many possible welding power sources and corresponding components that could be used. Furthermore, while specific controllers are described above, these descriptions are intended to describe functional aspects, and are not intended to limit the scope of the invention. Various hardware and software configurations can be used, and any number of processing devices can be used to provide the functions described. These devices can be provided in a single housing or distributed in multiple housings and locations. The hardware schematics are also provided by way of example, and are not intended to limit the invention.

Specific examples of display screens are shown above. However, each of these screens could include additional selections. For example, the applications available for download could also include service diagnostics, maintenance scheduling, welding heat calculator, and canned welding programs. An arc on timer and cycle counter can also be provided. Applications can also provide trigger options, automatic tack, alternative pulsing programs, customized applications such as extended heat ranges. An access key application may also be provided which downloads software that enables selective access to programming functions by way of passwords, hardware locks through a reading device, or other methods.

Furthermore, while a specific set of display screens and steps are described above, it will be apparent that these steps are exemplary only and the order and type of steps taken could be varied. The selections provided on the screens are also exemplary, and can include a number of other options. For example, although a pre-flow and post-flow time are illustrated in the welding sequence described with reference to FIG. 14, various other parameters could be specified. When a wire feeder is used, for example, run-in time and burn back could be provided. The system could also be used to establish a timed weld. The welding parameter set-up of FIG. 12, similarly, could include voltage limits, pulse peak, background, and frequency limits, and other types of data.

Furthermore, although a housing is shown in FIG. 1 including several components of the welding system 10, the communications devices, interfaces, controllers, and power source shown can be arranged in housings in various ways. For example, in some applications it is desirable for user interfaces and communications systems to be provided in remote devices. In other applications, these devices can be provided in the housing with power supply 12. In some applications it may be desirable for interfaces to be provided both within and remote to the power supply. Various methods of arranging these components will be apparent to those of ordinary skill in the art.

To apprise the public of the scope of this invention, the following claims are made:

What is claimed is:

1. A welding power source comprising:
   a power supply for generating welding power;
   a first memory, the first memory storing weld system configuration data and welding process application code for controlling the power supply;
   a communications port;
   a communications device configured for communications with an external computerized device, the external computerized device being in communication with a second memory, the second memory storing a plurality of welding process application codes for controlling the power supply; and
   a controller operatively coupled to the power supply, the communications device and the first memory, the controller programmed to retrieve a selected welding process application code of the plurality of welding process application codes from the external computerized device, and to store the selected welding process application code in the first memory, wherein the selected welding process application code adds additional functionality to the power supply, and wherein the controller accesses the selected welding process application code to control the power supply.

2. The welding power source of claim 1, wherein the selected welding process application code adds additional functionality enabling the power supply to provide a pulsed output having peak and background voltages or amperages.

3. The welding power source of claim 1, wherein the selected welding process application code adds additional functionality enabling the power supply to provide a sequenced weld including at least one timed sequence segment.

4. The welding power source of claim 1, wherein the selected welding process application code adds additional functionality that configures a communications port for communications between the controller and an external automated welding controller.

5. The welding power source of claim 4, wherein the communications port comprises a connector for use by the controller to access a remote trigger function.

6. The welding power source of claim 4, wherein the communications port comprises a serial link for communicating with the automated welding controller.

7. The welding power source of claim 6, wherein the communications port communicates over at least one of a RS-232, RS-485, ultra-high frequency, or RF protocol.

8. The welding power source of claim 1, wherein the selected welding process application code adds additional functionality enabling the power supply to produce an AC waveform at the welding power output.

9. The welding power source of claim 1, wherein the second memory further stores advisory data describing the welding process application codes, and the controller is programmed to access and display the advisory data describing the welding process application codes.

10. The welding power source of claim 9, further comprising a user interface including a display in communication with the controller, and wherein the advisory data is accessible from at least one of the user interface and the external computerized device.

11. The welding power source of claim 9, wherein the advisory data explains the welding process application code on a weld.

12. The welding power source of claim 1, wherein the selected welding process application code adds additional functionality enabling the power supply to adjust a frequency of an AC welding power output.

13. The welding power source of claim 1, wherein the selected welding process application code adds additional functionality enabling selection of timed weld sequence parameters.

14. The welding power source of claim 1, wherein the selected welding process application code adds additional functionality enabling the power supply to receive trigger signals from an external system.

* * * * *